United States Patent [19]

Yamamoto et al.

[11] Patent Number: 5,694,331
[45] Date of Patent: Dec. 2, 1997

[54] METHOD FOR EXPRESSING AND RESTORING IMAGE DATA

[75] Inventors: Akio Yamamoto, Yokohama; Takahiko Kamae, Kawasaki, both of Japan

[73] Assignee: Hewlett-Packard Company, Palo Alto, Calif.

[21] Appl. No.: 323,465

[22] Filed: Oct. 14, 1994

[30] Foreign Application Priority Data

Oct. 17, 1993 [JP] Japan ..................... 5-284042

[51] Int. Cl.$^6$ .................. G06T 1/00; G06T 9/20
[52] U.S. Cl. ..................... 364/514 A; 382/241
[58] Field of Search .................. 348/414, 417, 348/418, 422, 395, 399, 403; 382/253, 232, 240, 242, 241, 243, 248; 364/514 R, 715.02, 514 A

[56] References Cited

U.S. PATENT DOCUMENTS

| | | | |
|---|---|---|---|
| 4,903,317 | 2/1990 | Nishihara | 382/56 |
| 5,081,689 | 1/1992 | Meyer et al. | 382/22 |
| 5,353,394 | 10/1994 | Kubota | 395/141 |
| 5,522,019 | 5/1996 | Bala et al. | 395/124 |
| 5,559,901 | 9/1996 | Lobregt | 382/256 |

FOREIGN PATENT DOCUMENTS

| | | | |
|---|---|---|---|
| 0 437 002 A3 | 7/1991 | European Pat. Off. | H04N 1/41 |
| 2 662 041 | 11/1991 | France | H04N 7/12 |

OTHER PUBLICATIONS

Nakajima, Masayuki et al., "A Coding Method of Gray-Valued Pictures Using Density Contour Lines", Systems and Computers in Japan, vol. 16, No. 4, pp. 29–36. Translated from Denshi Tsushin Gakkai Ronbunshi, vol. 67-D, No. 4, Apr. 1984, pp. 1171–1177 Apr. 1984.

Makajima, Masayuki et al., "A Coding Method of Gray-Valued Pictures Using Density Contour Lines", Systems and Computes in Japan, vol. 16, No. 4, 1985, pp. 29–36 1985.

Defloriani, Leila, "A Pyramid Data Structure for Triangle-Based Surface Description", IEEE Computer Graphics and Applicaitons, vol. 9, Mar. 1989, No. 2 Los Alamitos, CA, pp. 67–78 Mar. 1989.

Handa, Shiro et al., "An Approximate Encoding Scheme for Line–Drawings Using the Concept of Vector Quantization", Systems and Computers in Japan, vol. 20, No. 1, 1989, pp. 74–81 1989.

So, Ikken et al., "Model–Based Coding of Facial Images based on Facial Muscle Motion through Isodensity Maps", SPIE vol. 1605 Visual Communications and Image Processing '91: Visual Communications, Nov. 11, 1991, pp. 263–272.

De Floriani, Leila, "A Pyramid Data Structure for Triangle-Based Surface Description", IEEE Computer Graphics and Applications, vol. 9, Mar. 1989, No. 2 Los Alamitos, CA., pp. 67–78.

(List continued on next page.)

Primary Examiner—James P. Trammell
Assistant Examiner—Tony M. Cole

[57] ABSTRACT

A method for expressing image data and for image restoration does not depend on the format of input/output devices, does not suffer from block distortion in the restored image, provides superior scale ability, and can be easily applied to motion pictures. The distribution of a pixel feature, such as luminance or chrominance, in a two dimensional (x,y) image space is expressed by contours, i.e. an isoluminance line or a line of equal color difference, on a curved surface with the feature along a z-axis. When restoring image data, regions between contours of the feature and regions in which peaks or saddles exist, even if the contours do not accompany them, are feature interpolated, and said curved surface is reproduced as a surface of a polyhedron, wherein the contour is a contour of a cross-sectional area of a curved surface that represents an image in x-y-z space in which the two-dimensional image on x-y plane is combined with the feature along the z-axis.

12 Claims, 23 Drawing Sheets

OTHER PUBLICATIONS

Handa, Shiro et al., "An Approximate Encoding Scheme for Line–Drawings Using the Concept of Vector Quantization", Systems and Computers in Japan, vol. 20, No. 1, 1989, pp. 74–81.

Hofmann, William D., et al., "Making Progressive Transmission Adaptive", IEEE Transactions on Communications, vol. COM–34, No. 8, Aug. 1986, pp. 806–813.

Nakajima, Masayuki et al., "A Coding Method of Gray–Valued Pictures Using Density Contour Lines", Systems and Computers in Japan, vol. 16, No. 4, 1985, pp. 29–36.

International Standard, ISO/IEC 11172-2: 1993(E) D.6.3.2.2 Quantizer scale.

Christoph Loeffler, Adrian Ligtenberg, and George S. Moschytz, "Practical Fast 1–D DCT Algorithms with 11 Multiplications", Proceedings of ICASSP '89, vol. 2, pp. 988–991.

Charles M. Williams, "An Efficient Algorithm for the Piecewise Linear Approximation of Planar Curves", Computer Graphics and Image Processing, 1978, vo. 8, pp. 286–293.

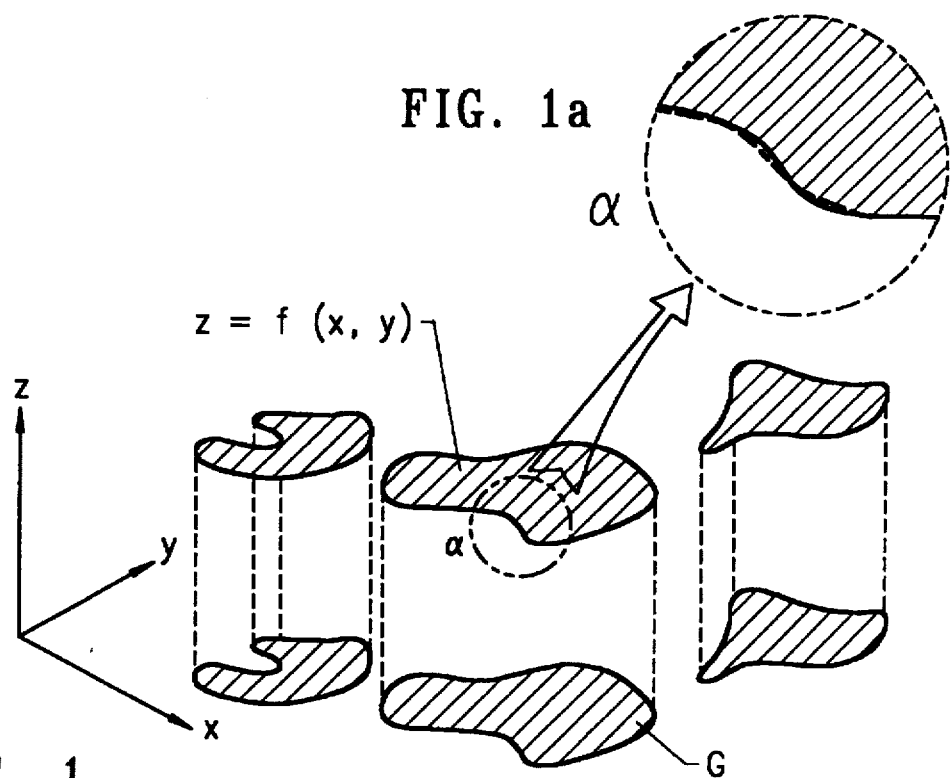
FIG. 1a
FIG. 1
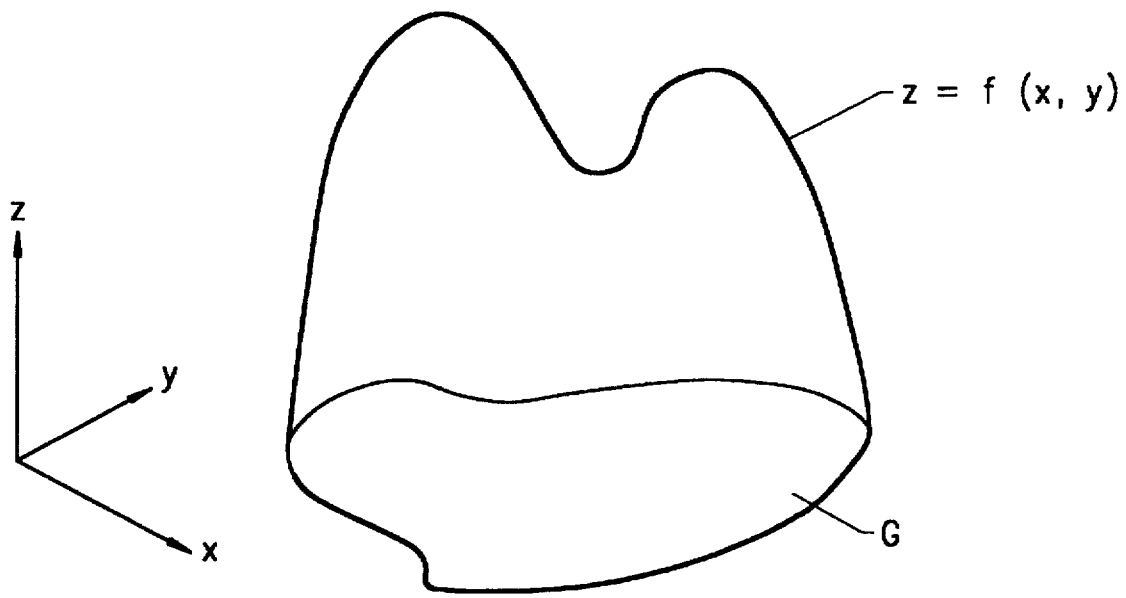
FIG. 2

BOF: FLAG INDICATING THE START OF DATA

EOF: FLAG INDICATING THE END OF DATA

BOF: A FLAG INDICATING THE START OF DATA

EOF: A FLAG INDICATING THE END OF DATA

BOG: A FLAG INDICATING THE START OF A GROUP
(ALSO INDICATING THE PRESENCE OF A SCENE CHANGE)

EOG: A FLAG INDICATING THE END OF A GROUP

INIT_FRAME: BIT STREAM FOR THE FIRST FRAME IN A GROUP

| CONVEX FIGURE ONLY | AT LEAST ONE OF FIGURES HAS CONCAVE PORTION |
|---|---|
| 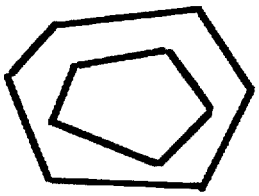 | (a) ONLY HIGHER LEVEL POLYGON HAS A CONCAVE PORTION 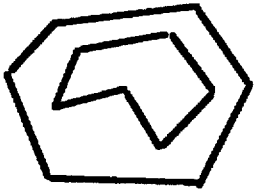 (b) ONLY LOWER LEVEL POLYGON HAS A CONCAVE PORTION 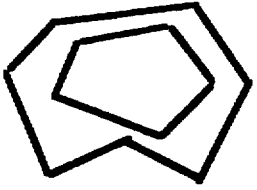 (c) BOTH POLYGONS HAVE RESPECTIVE CONCAVE PORTIONS 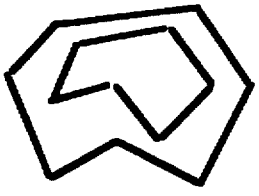 |
FIG. 31

METHOD FOR EXPRESSING AND RESTORING IMAGE DATA

BACKGROUND OF THE INVENTION

1. Technical Field

The present invention relates to a method for expressing and restoring image data. More particularly, the invention relates to a method for image expression and image restoration that does not depend on the image input/output devices, that does not suffer from block distortion in the restored image, that provides superior scale ability, and that is readily applied to motion video data.

2. Description of the Prior Art

In recent years, developments in large scale integrated circuit technology have enabled advances in electronics at a rapidly increasing pace. With the development of inexpensive, large capacity storage media having fast access times, it has become easy to process a large volume of data quickly. Images, including image information such as motion pictures, which were in the past mainly processed as analog signals are now progressively processed in a digital format. It has also become possible to combine text data and digital audio signals with digital images on a computer, creating so-called multimedia technology. Further, through the digitization of images it has also become easy, for example, to modify and/or process information, such that digital imaging technologies are increasingly applied to a variety of applications, such as movies, printing, and medical services.

As a result of these developments, the use of image data in each application has advanced the "multi-use" of information. For example, image data used in one application is often reused for another application, bringing about the interactive exchange of image information and data between respective applications.

It is therefore essential that common digital image technology is established to advance the interactive use of image information. Because items such as the required resolution, gradation, and number of colors are respectively different for each application in which a digital image is used, it is necessary to bring about a systemization of technologies and harmonization of standards to enhance the degree of hierarchical scale ability by formats, and thereby provide a common encoding algorithm. However, at present the format of the digital image depends on such factors as the input or output device. This is one obstruction to the progress of interactive image information.

Furthermore, even when the digital image is only used within a specific application, if the format of the image data heavily depends on a particular input or output device, data use is also greatly hindered. For example, if a camera is used as the image data input device, the size of the expressed image, resolution, gradation, and number of colors (e.g. the time resolution in the case of moving pictures) are specified by the camera. To show this picture on a display that does not correspond to the camera standards, the data format has to be changed. This requirement places significant limitations on the use of the image data in more than one application.

As a result of the foregoing, an implementation of the discrete cosine transformation ("DCT") has been adopted as an international encoding standard for still color images and dynamic images for storage media. The use of DCT has been adopted by the Joint Photographic (Encoding) Experts Group ("JPEG") and the Moving Picture Experts Group ("MPEG") and is currently widely used in the encoding of digital images. The most serious disadvantage of DCT is that the number of scan lines is limited by the device that inputs an original image. Further, DCT is basically a process that uses a sequential operation. Because transmission and display scale ability are limited, the quality of the restored image depends greatly on the input device. If a high quality restored image is to be obtained, there is an inconvenience in that the process is extremely complicated. Also, because the source image has to be divided into a number of blocks to obtain the DCT transformation coefficient, block distortion, i.e. image distortion at the boundaries between the blocks, occurs in the restored image.

An image processing or storage method based on a raster scan of the image data, as is known in the prior art, is not suitable for use as a format for an image data expression method and restoration method that is independent of the input device or output device. For example, the process of changing the raster data in the fixed spatial resolution of a specific device to a different spatial resolution, or to a different aspect ratio, is extremely difficult. Accordingly, the state of the art does not present a simple, multi-application standard for processing and storing digital images.

SUMMARY OF THE INVENTION

The invention provides a method for expressing image data and a method for image restoration that do not depend on format of the image input/output devices, that do not suffer from block distortion in the restored image, that provide superior scale ability, and that are readily applied to motion video data The invention exploits the fact that an image expression format using vector data provides superior spatial scale ability, provides a high degree of freedom, explicitly handles information pertaining to the geometrical structure of objects within an image, and is therefore adequate for expressing image data. In the invention, a two-dimensional image, i.e. an image on the x-y plane, is regarded as a curved surface in space having a characteristic quantity or a feature, e.g. luminance or brightness, color difference, sound level, or pressure, of the image measured on a Z-axis. The geometrically three-dimensional structure is efficiently introduced to represent such features of a plane image as those mentioned above, such that an image is more easily processed.

The method for expressing data in this invention represents a feature value given for each point on a two-dimensional image space by contour lines on a curved surface on which the feature value is measured in the Z-axis direction. The characteristic quantity or feature specifically defined herein is either the luminance or chrominance of an image for purposes of example, but it may also include pressure, sound pitch, and so forth in a wider sense.

In the image data restoration method of the invention, where the expressed data regions are lacking a contour line, such as regions between successive contours or regions including peaks or saddles, the feature is interpolated (for example, if the feature is luminance, luminance interpolation is carried out, and if the feature is color difference, color difference interpolation is carried out), and the curved surface is reproduced as a polyhedron, which is typically paved by triangular or quadrangular patches.

In the image data restoration method of the invention, the feature expressed using the above method may be luminance. Where the luminance has only two values, i.e. where the pixel value is "1" or "0," these two values can be allocated to differentiate the two regions separated by the contour line.

In the invention, contour lines ("contours") are contours of the cross-sectional areas made by slicing a curved surface perpendicularly through the Z-axis, where a two-dimensional image on an x-y plane is regarded as the curved surface in x-y-z space by using the z-axis for measuring the feature value. Contour lines are referred to as isoluminance lines, when the feature is luminance; and as lines of equal color difference, when the feature is chrominance.

Feature interpolation is defined herein as the interpolation of the region between two neighboring contours. More specifically, the region between the contours is approximated to a polyhedron, and interpolation of the luminance or color difference takes place while gradually varying their values from one contour to the other. Where the feature is luminance, the feature interpolation is referred to as luminance interpolation; and where the feature is color difference, the feature interpolation is referred to as color difference interpolation.

Where a peak or saddle point is not coincident with a contour, a feature value is interpolated for the region between the value defined for the characteristic amount and the line of equal height. More specifically, a region in which a peak or saddle occurs is approximated to a polyhedron and interpolation is carried out so that features for these portions, such as luminance or color difference, change gradually.

In the invention, the feature for the image is expressed using the contours in a geometrically three-dimensional structure, which is then adopted as an expression format of the image data. Such image data obtained in this way can then be stored and transmitted.

The method of expressing and restoring the image data in the invention is particularly useful in applications where the feature for the image is luminance or color difference. A feature of luminance or color difference is therefore primarily relied upon in the following explanation.

The luminance and chrominance (usually color difference) of images, where the image data is expressed (that is, coded) using the method of the invention, is processed independently with regard to the spatial resolution of input devices such as cameras or scanners. Also, the restoring (that is, decoding) process does not depend on these devices, such that it is easy to reproduce the image at resolutions corresponding to a variety of output devices, such as the resolution of a display or a printer.

The expression method of the invention may also be used while an image is outputted by image processing software, e.g. graphics applications software such as paint systems or draw systems; and the decoding method of the invention may be implemented by the same software while receiving image data expressed using the method of the invention.

The invention has many advantages, such as:

(1) the expression method for the original image does not depend on the spatial resolution, i.e. number of picture elements, specified by the original image input device;

(2) because the method herein described is not a process that takes place block by block, inter-block distortion does not occur in the restored image;

(3) flexible scale ability is obtained because the encoding and decoding process takes place in a coordinate system that is independent of the spatial resolution of the various input and output devices;

(4) the method herein described is readily extended to moving pictures; and (5) the process herein described is amenable to a wide range of applications as image processing technology becomes more extensively used.

In the image data decoding and restoring method herein described, an interpolation process is necessary. This process may take some time, depending on the degree of resolution desired. The method herein is therefore particularly useful in applications, such as non-real-time applications or databases. However, the decoding process is also applicable to the demands of practical applications, such as real-time applications, if the time necessary for interpolation processing is reduced, for example by using means such as a processor for high speed image processing.

As described above, distortion is encountered in the boundary regions between blocks for restored images in the prior art DCT method. However, because any distortion that may occur in the image data encoding and decoding method herein is dispersed throughout the whole of the image, a much more natural image is obtained with the method herein described than with a DCT method. In the prior art DCT method, the image is expressed as simple two-dimensional data, and encoding and decoding of the luminance and color difference are primarily carried out by use of signal processing technology. In the invention, however, the image is not regarded as simple two-dimensional data, but instead is regarded as three-dimensional data further having a luminance or color difference along a Z-axis. In this way, the separate processing of the luminance or color difference data is replaced by the geometrical processing of vectors such that, for example, the rotational motion of objects is easily processed.

While the information source, for example for a digital image (including dynamic images) for a data base service, is considered to be common, it is unusual for the respective users of the source to use different application software and different hardware when reading the images, or to use different output devices. As a result of these factors, it was often impossible in the prior art to read out images expressed using one method with particular application software or hardware, nor was it possible to output an image using certain output devices.

However, using the invention it is possible to decode (i.e. reconstruct) encoded images to match the resolution for a variety of input and output devices. Even if the device is different from the coding device, transformations can be performed in accordance with the resolution of the recording device. The invention allows control of the quality of the restored image in accordance with the level requested by the user. For example, the invention provides applications in an image database, such as the restoration of images at a low resolution level during a search and then restoration of a desired picture at a high resolution.

The image data expressed using the method of expression herein may be processed together with image data using a different kind of vector expression or with image data which do not use vector expression, such as a bit map display. The image data expression method herein may also be applied exclusively to a local part of the image.

In the image data expression method herein, the distribution of a feature of an image is expressed using contours and lines of equal difference, i.e. by recursively slicing a three-dimensionally expressed curved surface, and in the following (1) to (N) steps, an approximation of information is selectable from course to fine resolution in a stepwise manner.

(1):

Contours are formed on the curved surface expressing feature values along a Z-axis.

(2):

Equal difference lines are formed on the first error curved surface expressing along the Z-axis erroneous differences (hereinafter also called errors) between the feature distribution of a restored image and the feature distribution of an original image.

(k) (k=3, . . . , N):

Equal difference lines are formed on the k-th error curved surface expressing along Z-axis an erroneous difference between an error value that is restored based on the equal difference lines given in step (k−1) and an error value on the (k−2)th error curved surface.

Here, the term "equal difference lines" refers to the contour of a cross-sectional area formed when the error curved surface is sliced by plane at right angles to the Z-axis. Where the feature for the image is luminance or color difference the contour is known as the isoluminance line or the line of equal color difference, and the term "equal difference lines" refers to both the equal luminance error line and the line of equal color difference error.

The contours obtained in this image data expression method may also be stored and transmitted as image data.

The expression of the image data using the following processes (1) to (N) is now explained in more detail.

(1):

1) Providing a curved surface $z=f(x, y)$ on which the Z-axis measures the value of the feature for the image;

2) Expressing said curved surface, $z=f(x, y)$ using contours;

3) Creating a polyhedron $z=g(x, y)$ from these contours using the image data restoration method employing said feature (luminance) interpolation;

(2):

1) Obtaining error curved surfaces $z=h_{1,1}(x, y)$ and $z=h_{1,2}(x, y)$ corresponding to the positive and negative error values by computing Z-axis errors of said polyhedron $z=g(x, y)$ from said surface $z=f(x, y)$;

2) Expressing error curved surfaces $z=h_{1,1}(x, y)$ and $z=h_{1,2}(x, y)$ using contours;

3) Computing polyhedrons $z=i_{1,1}(x, y)$ and $z=i_{1,2}(x, y)$ from said contours employing said decoding (or restoration) method for the image data;

(k) (k=3, . . . , N−1):

1) Obtaining error curved surfaces $z=h_{k-1,1}(x, y)$, $z=h_{k-1,2}(x, y)$ corresponding to the signs of Z-axis errors, one between said error curved surface $z=h_{k-2,1}(x,y)$ and said polyhedron $Z=i_{k-2,1}(x, y)$ and the other between said error curved surface $z=h_{k-2,2}(x, y)$ and said polyhedron $Z=i_{k-2,2}(x, y)$;

2) Expressing these error curved surfaces $z=h_{k-1,1}(x, y)$, $Z=h_{k-1,2}(x, y)$ by equal difference lines;

3) Constructing the polyhedrons $Z=i_{k-1,1}(x, y)$, $Z=i_{k-1,2}(X, y)$ from said equal difference lines by employing said image data restoration method;

(N):

1) Obtaining the error curved surfaces $Z=h_{N-1,1}(x, y)$ and $Z=h_{n-1,2}(x, y)$ corresponding to the positive and negative values of the z-axis errors, one between said error curved surface $z=h_{N-2,1}(X, y)$ and said polyhedron $Z=i_{N-2,1}(x, y)$ and the other between said error curved surface $Z=h_{N-2,2}(x, y)$ and said polyhedron $Z=i_{N-2,2}(X, y)$;

2) Expressing these error curved surfaces $z=h_{N-1,2}(x, y)$ and $z=h_{N-1,2}(x, y)$ using equal difference lines.

The image data is then restored by successively adding up to (j) ($2 \leq j \leq N$) error values restored based on the equal difference lines in the steps (2) to (N) of the feature restored based on the contours in step (1). That is, the degree of restoration is selectable from coarse restoration (for example, when j=2) to fine restoration (for example, j=N). When an image data base is searched, the images can be displayed with a low degree of restoration (resolution) and when the desired image is found, a higher degree of restoration can be used.

BRIEF DESCRIPTION OF THE DRAWINGS

FIG. 1 shows luminance values plotted along the z-axis direction for each picture element of a binary image defined on an x-y plane in accordance with the invention;

FIG. 2 shows luminance values plotted along the z-axis for each picture element of a gray-scale image defined on an x-y plane in accordance with the invention;

FIG. 31 shows typical relationships in various shapes of neighboring polygons in accordance with the invention.

DETAILED DESCRIPTION OF THE INVENTION

Figure 3:
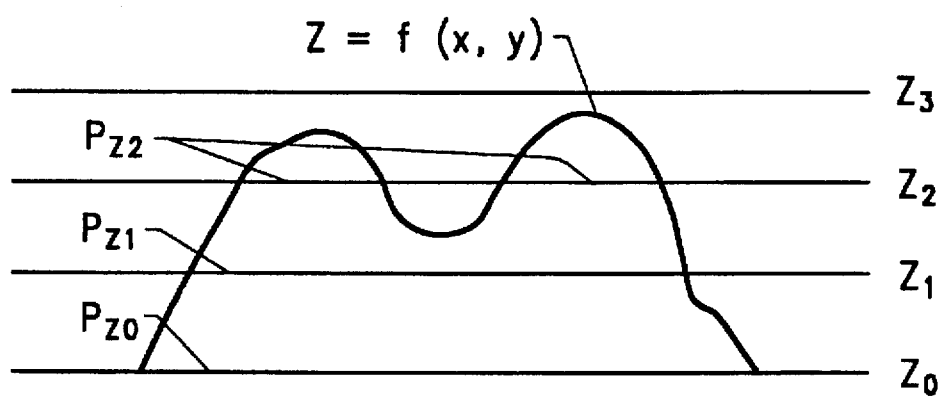
FIG. 3 shows slicing of a curved surface that represents image data in which there are four slice levels.

Encoding process in a method for expressing image data.

The following discussion is divided into a description for binary images, gray-scale images, and color images.
Encoding Process for Binary Images.

If a plot of the luminance of each of the picture elements is made along the z-axis with a source image G defined in the x-y plane, the binary image data is defined by z=f(x,y). In this case, z=f(x,y) can be expressed by planes in three dimensions as shown in FIG. 1.

In FIG. 1, the positive direction of the z-axis is the direction in which the luminance becomes greater but, alternatively, the negative direction of the z-axis may also be used for expressing an increase in luminance.

Binary encoding is performed in the following way:

First, the edge of the source image G is detected, i.e. tracking is carried out on the edges of the source image G, and the expression format data is converted from raster data format to vector data format. While the detected edges are curves in general, a polygonal approximation is performed on them to a desired precision (please refer in FIG. 1 to the expanded view, identified by the designator α). Information relating to the end points of each vector constructing the polygon obtained in this way is then encoded and used as storage data or transfer data for the source image G.

The aforementioned conversion from raster data to vector data is described in C. M. Williams, *An Efficient Algorithm for the Piecewise Linear Approximation of Planar Curves*, CGIP (Computer Graphics and Image Processing) 1978, Vol. 8; and Ohsawa and Sakauchi, *The Processing of Vectors using Multi-dimensional Data Structures-Vectorization of Figures*, IEICE Transactions, Vol. J.86-D, No. 4 (1985), and as this is a well-known method, further description is omitted.

The foregoing discussion concerned the case where the edge detected for the source image G is a closed loop in an display domain. It is, however, also possible that the edge may appear to be open. In this case, an edge of this display domain can be considered to be a part of the image edge, and the image edge can again be processed as though it were closed.

When the edge of the source image is approximated into a polygon, the encoding efficiency and the quality of the decoded image depend on the precision of the approximation, which is one of the parameters to be selected for the encoding efficiency (expression efficiency).
Gray-scale Image Encoding Process.

In the same way as for binary images, by defining gray-scale image data by z=f(x, y), the source image G can be expressed as a curved surface function having a convex or concave surface with a simple non-negative (zero or positive) value for z. An example of a curved surface z=f(x, y) is shown in FIG. 2.

(a) To find equal luminance lines, there are assumed to be s level surfaces in three-dimensional space that are mutually parallel, and that are placed perpendicular to the z direction with an appropriate spacing. If the cross-sectional areas created by slicing the curved surface with s slice levels $z_0$, $z_1$, ..., $z_{s-1}$ are denoted $P_{z0}$, $P_{z1}$, ..., $P_{zs-1}$, respectively, the following relationship between these areas results:

$$P_{z0} \geq P_{z1} \geq \ldots \geq P_{zs-1} \qquad (1)$$

Figure 4:
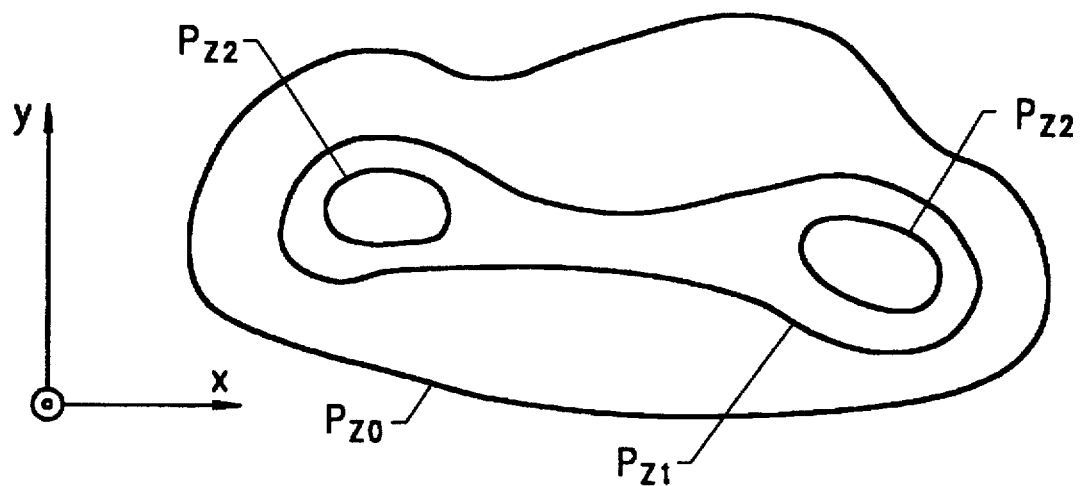
FIG. 4 shows isoluminance lines for the curved surface that represents the image data of FIG. 3.

FIG. 3 shows sliced elements for s=4 and z=f(x, y) and FIG. 4 shows $P_{z0}$, $P_{z1}$, and $P_{z2}$ corresponding thereto. Because $Z_3$ does not intersect with z=f(x, y), $P_{Z3}$ is not shown in FIG. 4. The profiles of the cross-sections for each respective level obtained in this way (i.e. isoluminance lines) are approximated into a polygon in the same way as for the binary image and encoded. The value of the slice level (i.e. luminance) for the respective isoluminance lines are encoded at the same time.

Figure 5:
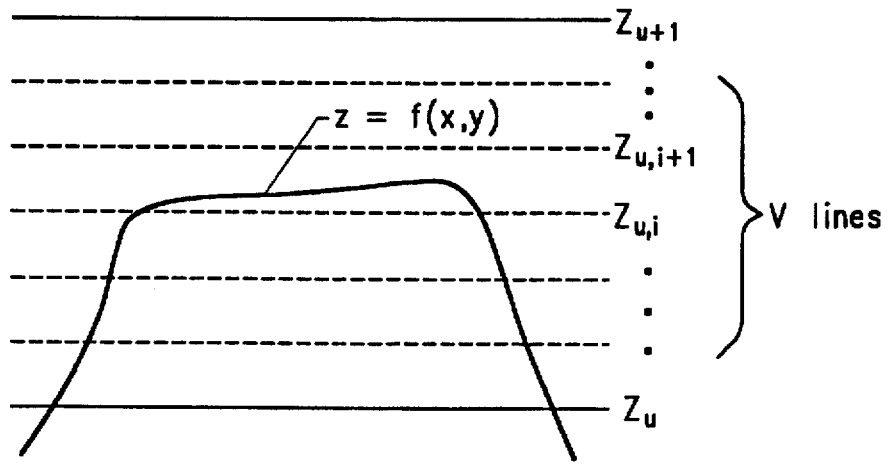
FIG. 5 shows the detection of the position of a peak in accordance with the invention.

(b) When the three dimensionally displayed gray-scale image data is sliced at a level $Z_u$, the positive integer u exists, such that there is an isoluminance line at $Z_u$, but there is not an isoluminance line at $Z_{U+1}$. At this time, as is shown in FIG. 5, the position of the peak can be determined with more accuracy by investigating whether or not equal luminance lines are at v slice levels (in FIG. 5, v is 5) between $Z_u$ and $Z_{u,i}$. By denoting these levels as $Z_{u,k}$ (k=0, 1, ..., v−1) it can be determined that the peak falls between $Z_{u,i+1}$, for which the isoluminance line no longer exists, and the immediately previous value $Z_{u,i}$ (where $0 \leq i \leq v-1$) for which the isoluminance line still exists. The peak at this time is then described by the difference $(Z_{u,i}-Z_U)$ and the data which polygonally approximates the isoluminance line of $Z_{u,i}$.

Figures 6A, 6B:
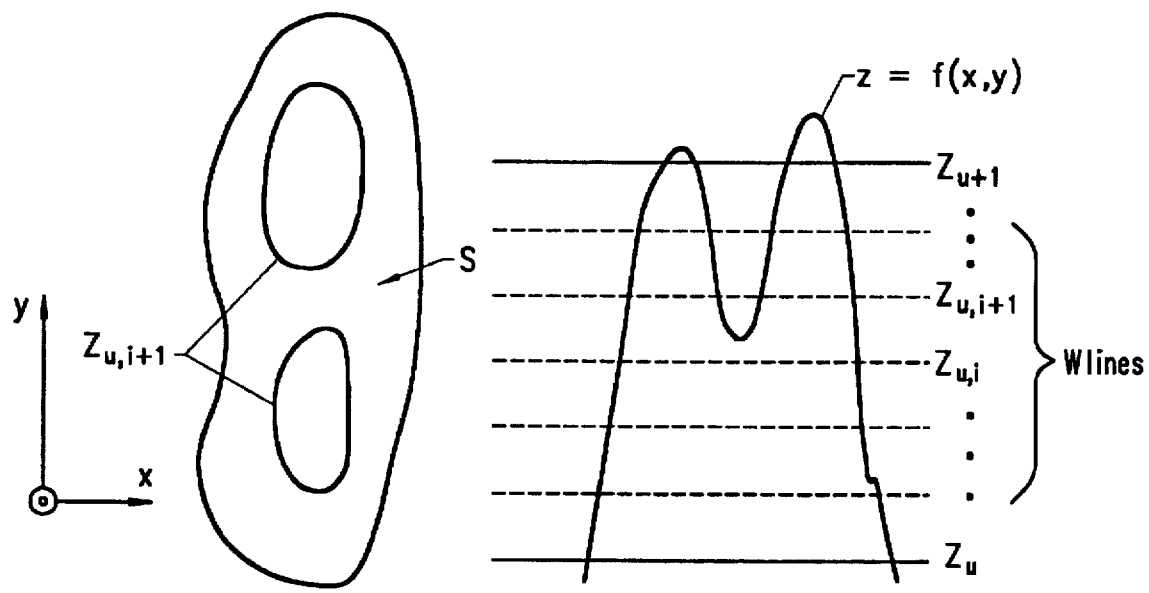
FIG. 6 shows the detection of the position of a saddle in accordance with the invention, where (a) shows an onset of bifurcation, and (b) shows detection of a saddle.

(c) At the slice levels $Z_u$ and $Z_{u+1}$, if a bifurcation shown in (a) of FIG. 6 occurs, a bifurcation saddle S is detected in the same way as is used for the peaks, as is shown in (b) of FIG. 6. That is, the position of the saddle S can be more accurately determined by performing slices at w levels between $Z_u$ and $Z_{u+1}$ to investigate whether or not a bifurcation is present. By then denoting these levels as $Z_{u,k}$ (k=0, 1, ..., w−1), the position of the saddle S can then be determined to be between the value at which the saddle S initially occurred $Z_{u,i+1}$ and the value immediately previous to this value $Z_{u,i}$ (where $0 \leq i \leq v-1$).

At this time, the saddle is described by the difference $(Z_{u,i+1}-Z_u)$ between $Z_{u,i+1}$ and $Z_u$, and the data which polygonally approximates the line of isoluminance for $Z_{u,i+1}$.

The gray source image can then be expressed as an approximation using the operations described above in (a) to (c).
Color Image Encoding Process.

The colors red, green, and blue (RGB) are the basic color components used by most color sensing devices. However, the way in which people perceive brightness and color varies dramatically. Taking this into consideration, it can be seen that it is more efficient to process information divided into luminance information and color information (color difference information) when encoding a color image. Also, considering the case when an image is to be output using a monochrome printer, it is efficient to divide the information up into luminance information and color difference information only to output the luminance information.

It is well-known that a color space in which color signals are the color information expressed as a luminance signal and two color difference signals, and a variety of color spaces. Such color spaces typically include YCbCr, (Y, B-Y, R-Y), YPbPr, YUV or YIQ. It is possible to adopt any of these schemes for the invention, but here a color space YCbCr using component signals conforming to the usual CCIR recommendation 601 is used.

Following the above description, as it is known that a human is more sensitive to the luminance signal (Y) than to color signals, encoding is performed on the luminance signal using the same algorithm as for the gray-scale image described above. On the other hand, it is known that sensitivity to the chrominance signals (Cb, Cr) is relatively low, so it is not necessary to code these signals with the same accuracy as that for the luminance signal (Y). An encoding which is coarser than that for usual luminance signals may therefore be used.

Figure 7:
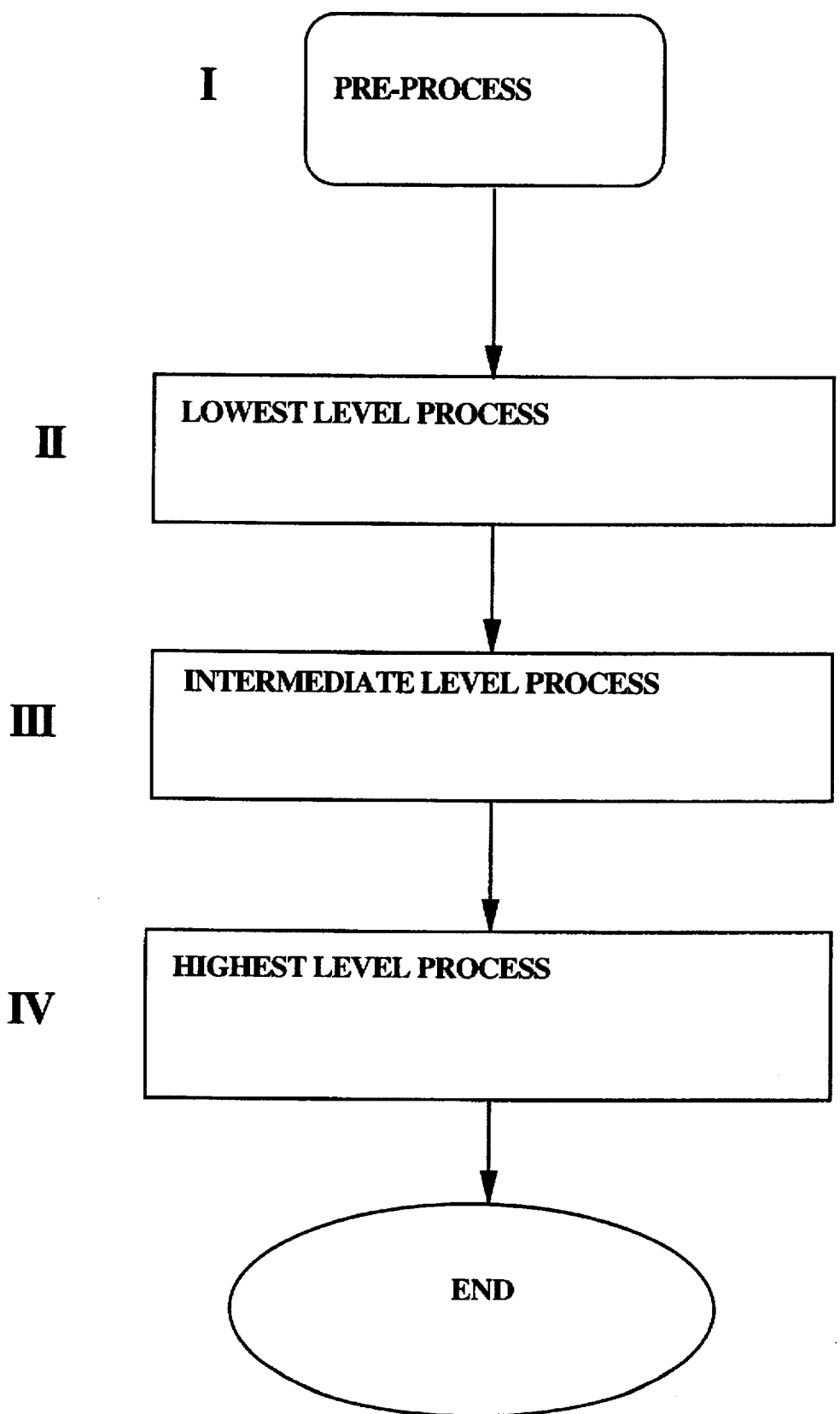
FIG. 7 is a flowchart showing the overall flow of the encoding process for a still image in accordance with the invention.

A more detailed description is now provided of the encoding process for luminance, as shown in FIGS. 7 to 10. FIG. 7 is a flowchart showing the overall luminance encoding process, which is composed of (I) a pre-process, (II) a lowest level process, (III) an intermediate level process, and (IV) a highest level process.

Figure 8:
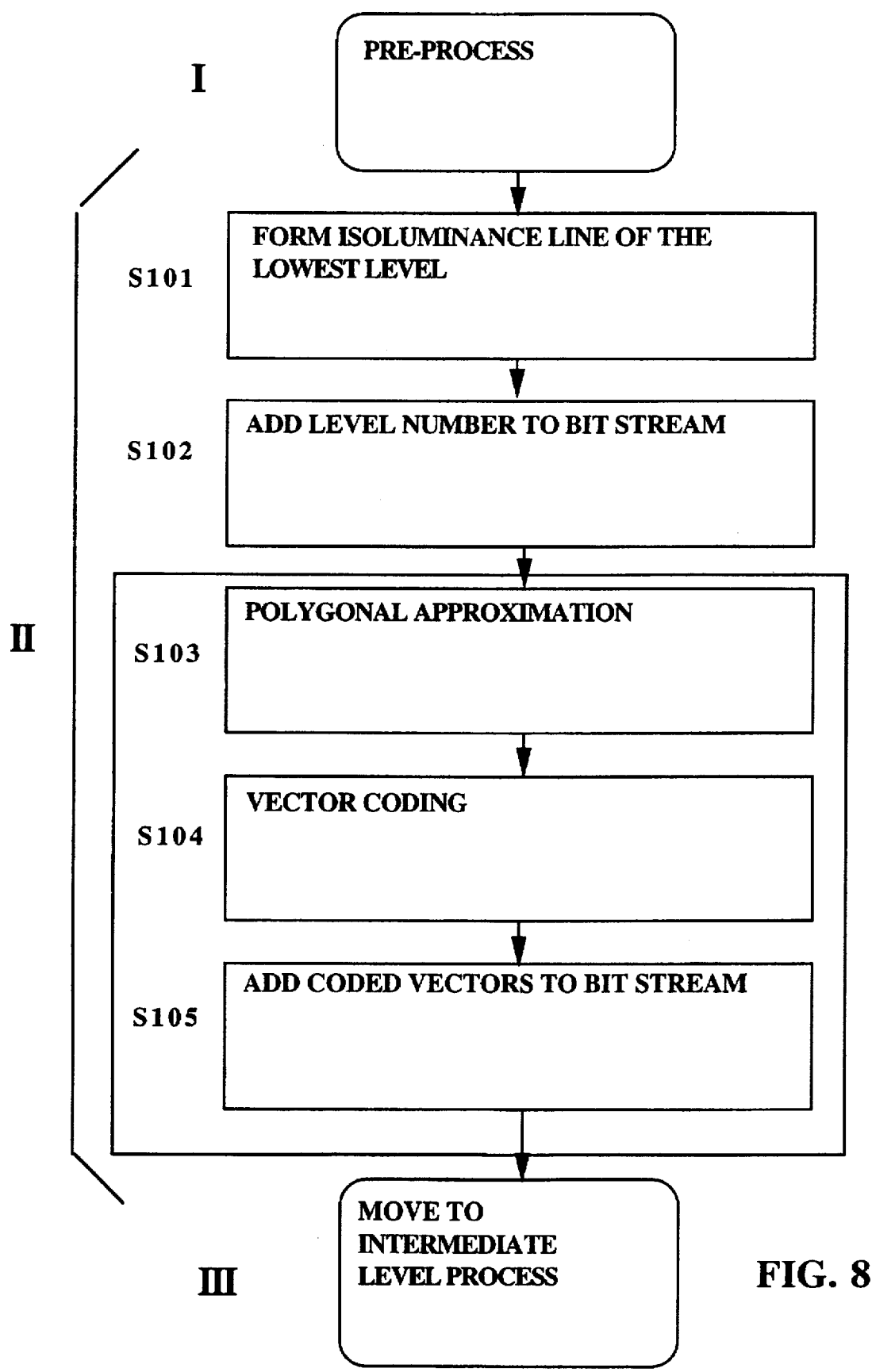
FIG. 8 is a flowchart showing the flow for the lowest level of the process shown in FIG. 7.
Figure 11:
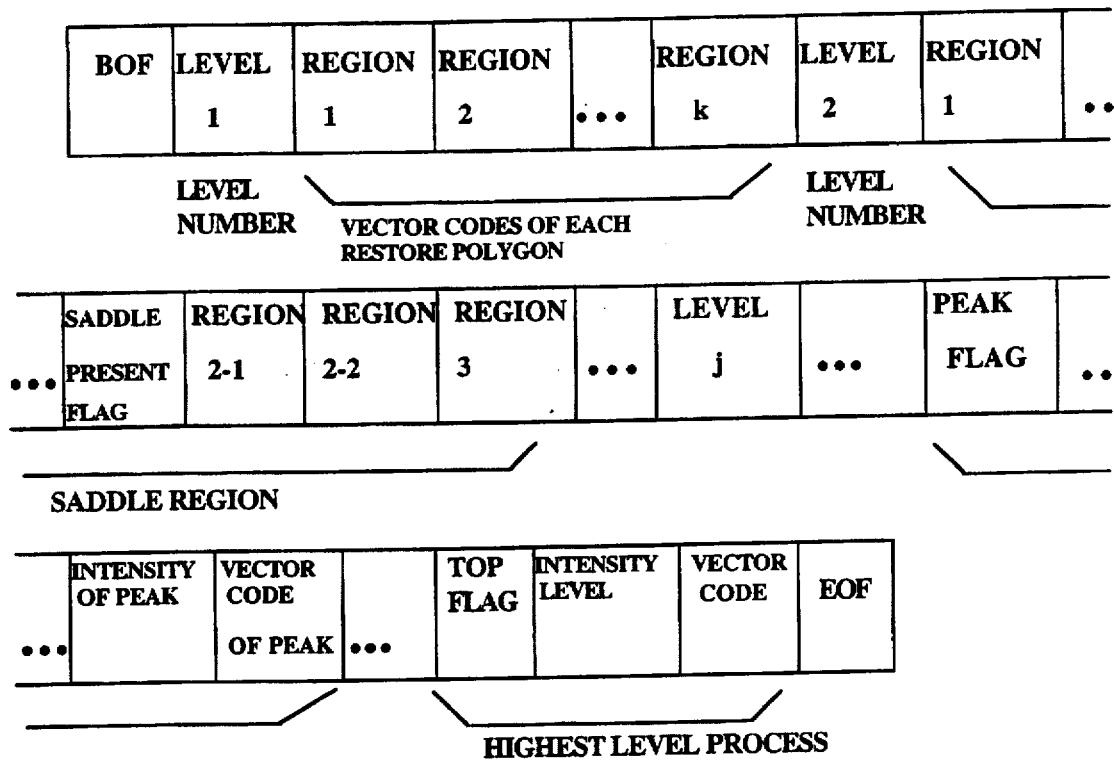
FIG. 11 shows an example of a bitstream occurring in the encoding process for a still image in accordance with the invention.

In the pre-process step in (I), it is determined if the image to be the processed object is a binary image, a gray-scale image, or a color image, and the slice level spacing is determined. Also, the change in luminance below the slice level spacing is investigated, and the lowest luminance level isoluminance lines (lowest level) are identified. As can be seen from FIG. 11, the bitstream composed of various data (i.e. items such as the designation of the image type and color space) for the image begins with the flag indicating the start of data (BOF) is formed. The process is then transferred to the lowest level process (II). In the lowest level process in (II), as is shown in FIG. 8, the isoluminance line occurring at the lowest level (i.e. the first luminance level for which an isoluminance can be made, starting slicing from where the luminance is 0 is made (S101) and a level number is added to the bitstream (S102, please refer to FIG. 11).

Next, a polygonal approximation is carried out on the isoluminance line (S103), and these various polygonal shapes are encoded so as to be expressed as vectors (S104). After these items of data have been added to the bitstream (S105, please refer to FIG. 11), the intermediate level process in (III) follows. The process in steps (S103 to S105) therefore detail all of the isoluminance lines occurring in the lowest level.

Figure 9:
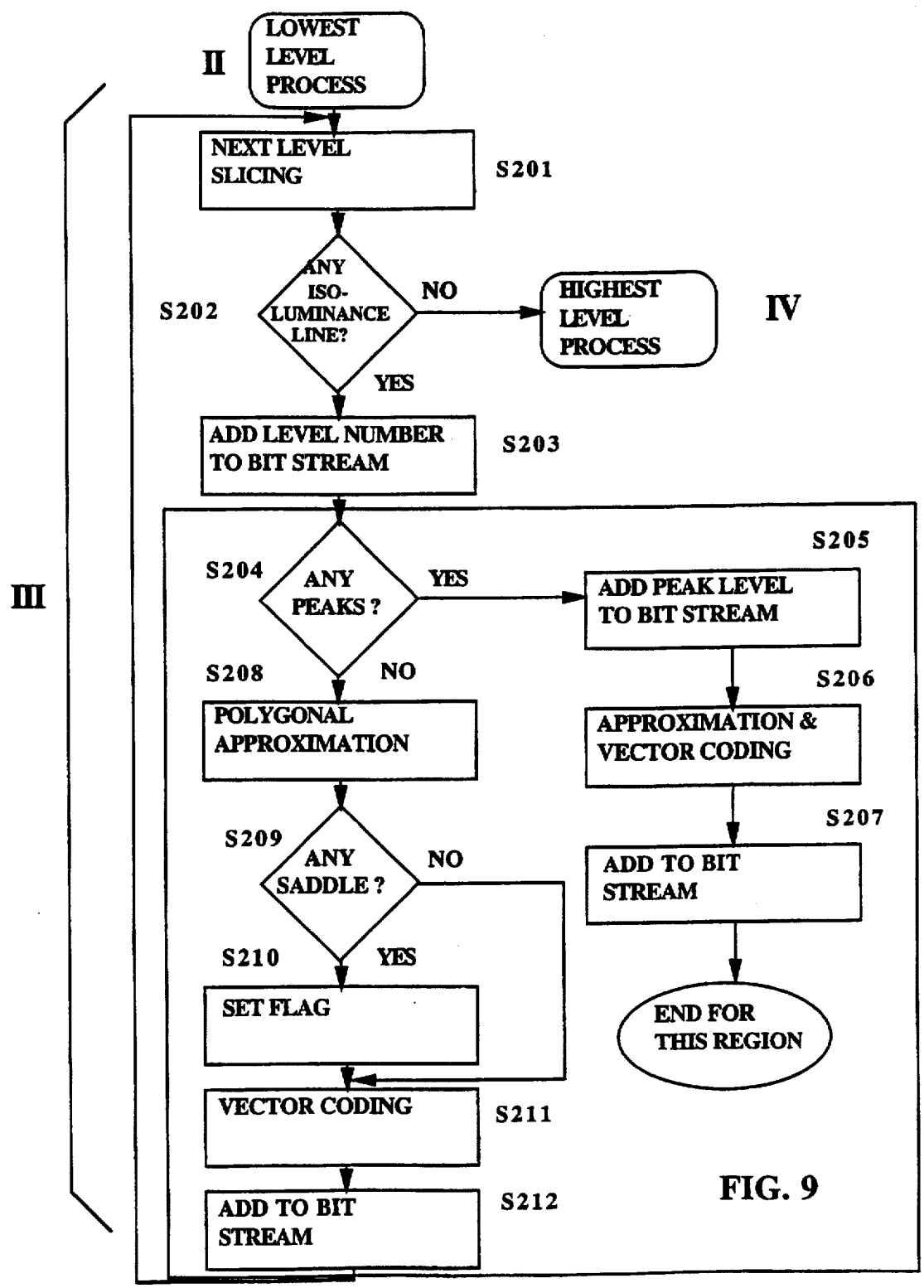
FIG. 9 is a flowchart showing the flow for the intermediate level of the process shown in FIG. 7.

In the intermediate process level in (III), as is shown in FIG. 9, the next level slice process is carried out (S201), and it is determined whether an isoluminance line exists or not using this slice process (S202). If an isoluminance does not exist at this time, the highest level process (IV) follows. If it does exist, a level number is added to the bitstream (S203, please refer to FIG. 11 ), and the method proceeds to the following process (S209). It is then determined whether or not there is a peak present (S204). If there is a peak present, its level is obtained and is added to the bitstream (S205). The peak shape is then polygonally approximated and vector encoded (S206). These coded data are then added to the bitstream (S207, please refer to FIG. 11 ) and the processing for this region is then complete.

In the method (S204), if a peak is not present a polygonal approximation is carried out (S208), and it is then determined whether or not there is a saddle present (S209). When there is a saddle present, a "saddle present" flag is set at the bitstream (S210, please refer to FIG. 11 ) and then, depending on the circumstances, the polygonal shape and luminance information are encoded into vector form (in a way to be described later). In the method (S209), if there is no saddle present, the process goes straight to the step (S211) without going through the step (S210). Vector coding is then carried out at step (S211) and these codes are then added to the bitstream (S212, please refer to FIG. 11). After this, the process returns to step (S201). The processes at step (S204) and its followers are then carried out on the isoluminance lines.

Figure 10:
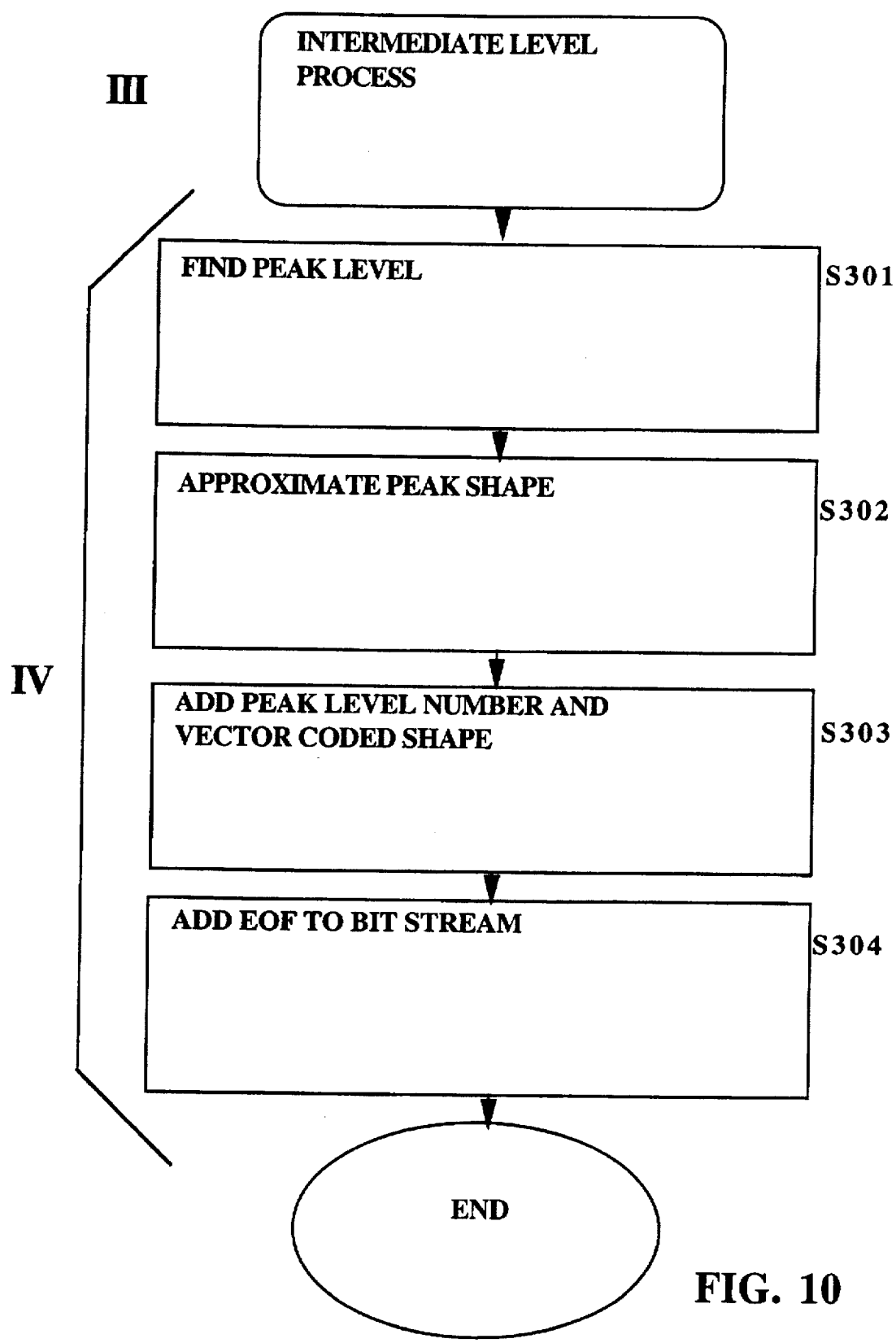
FIG. 10 is a flowchart showing the flow for the highest level of the process shown in FIG. 7.

In the highest level process, as is shown in FIG. 10, the process for the highest peak is carried out. That is, the peak level is obtained (S301), the peak shape is obtained (S302), a peak level number and a vector encoded shape are added to the bitstream (S303, please refer to FIG. 11 ), and a flag indicating the completion of the data is added to the bitstream (S304, please refer to FIG. 11 ) so that the process is complete.

(2) Reconstruction signal processing occurring in the reconstruction method for the image data in this invention:

The reconstruction of the image data is carried out in the following sequence.

(I) The vector diagrams (that show polygonal approximations of the isoluminance lines) are restored from the transmitted image data. The luminance value for each picture element is obtained via interpolation processing between the restored isoluminance lines of corresponding levels. The luminance values may be calculated by covering up the surface with triangular or quadrangular patches (in this specific embodiment the patches are triangular), while restoring the peak and saddle (hereinafter explained).

Interpolation processing between adjacent levels depends greatly on the respective shapes of the isoluminance lines. However, if the shapes of the isoluminance lines are broken down into a number of patterns beforehand, as is shown in FIG. 31, restoration can be carried out by processing just the patterns shown.

Convex Contours Only.

First of all, interpolation procedures for data in which isoluminance lines of a given level and a level subsequent thereto are convex polygons and no bifurcation are present are explained below. As is shown in FIG. 12 at (a) to (c), the lower level isoluminance line is P, and the higher level isoluminance line is Q.

Step 1: As is shown in FIG. 12 at (a), the respective vector end points in P are connected by a corresponding straight line to their closest vector end points in Q. These straight lines are indicated by the broken lines in FIG. 12.

Step 2: As is shown in FIG. 12 at (b), end points in Q left unconnected in the first step (shown by $q_0$ in FIG. 12 at (b)) are connected via a straight line to their nearest vector end points in P. These are indicated by the thick broken lines (between the points $q_0$ and $P_n$) in FIG. 12 at (b).

Step 3: If the patch figures obtained in this way are already all triangular, then the next process immediately follows without further modification.

Step 4: However, as is shown in FIG. 12 at (c), when some of the aforementioned patch figures are quadrangular in shape, the shortest of two diagonal lines is chosen to connect opposing vector end points so as to divide the quadrangular area into two triangular patches. These are shown by the dotted lines in the figure.

By using this operation, the space between the isoluminance lines P and Q is completely covered with triangles. In this embodiment, quadrangular figures obtained in steps 2 and 3 are divided up into triangular patches in step 4. It is, however, also possible to leave the quadrangular figures as they are for further processing.

At least one of the isoluminance polygons is concave.

When at least one of a polygon made from the isoluminance line of one level and a polygon made from the isoluminance line of the next level is concave, the subsequent process differs depending on: 1) which polygon is concave; 2) what kind of shape the concave part takes on; and 3) what the position relationship is between the two polygons when both polygons have concave shapes. Basic procedures in this case separate concave parts off from a polygon and the rest of polygon is treated as a figure.

Figure 13:
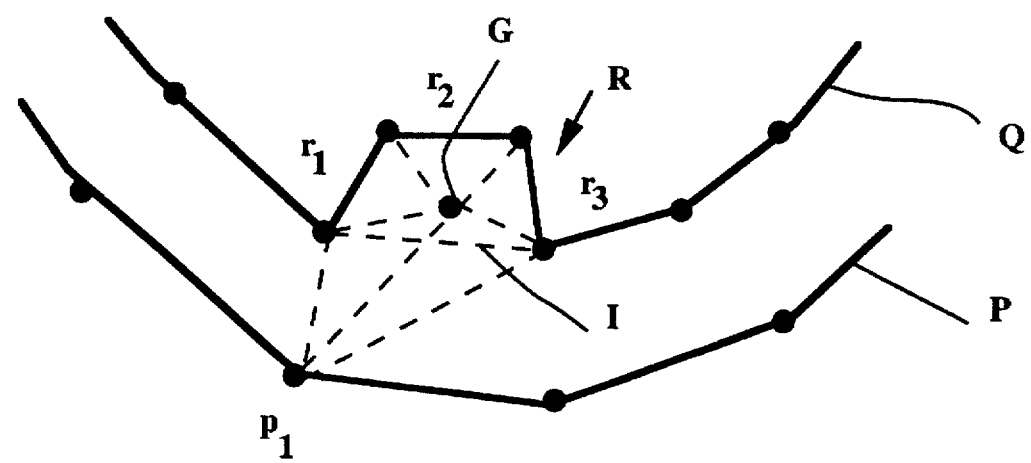
FIG. 13 shows an interpolation process in accordance with the invention, in which a polygon made from an isoluminance line of a higher level is concave.

When polygons made from the isoluminance line of a higher level are concave:

First, procedures are described in a case where, when the concave parts are separated off by imaginary vectors as is shown in FIG. 13, the quadrangle R made up from the imaginary vector I and vectors $r_1$–$r_3$ forming a concave portion appears to be convex.

Step 1: The center of gravity G of the quadrangle R split off by the imaginary vector I is obtained.

Step 2: In one embodiment, a level of the center of gravity G is assumed to be the average of two levels of isoluminance P and Q, and triangular patch processing is then carried out by making connections between each of the points of the quadrangle R and the center of gravity G.

Step 3: The point of the isoluminance line P of the lower level that is nearest to the center of gravity (in this figure this is shown as p1) is obtained, and connecting triangular patch processing is carried out on this point p1, the center of gravity G and both ends of the separating imaginary vector I.

Step 4: Regarding the end points that are left over after processing in Step 3, one vector on the higher level isoluminance line is taken for the imaginary vector and triangular patch processing is carried out in the same processing sequence as on convex only figures.

In the above example, triangularization (triangular patch processing) was carried out by obtaining the center of gravity G. However, other points (e.g. the central point) may also be used in place of the center of gravity. Also, methods other than those described above in Step 2 may be used to determine a level of the center of gravity. Various other methods may also be adopted, such as determining the level by comparing the respective distances from P and Q to G.

Figure 14:
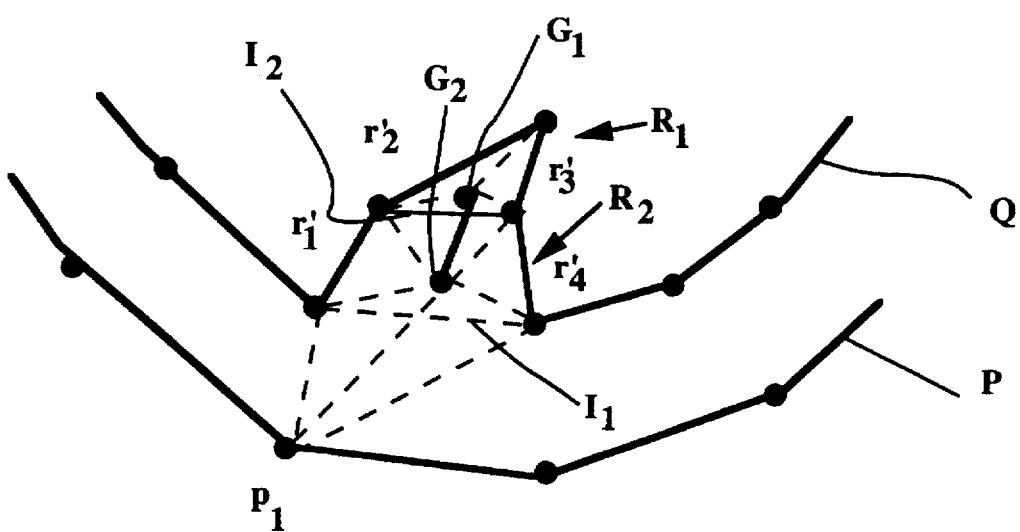
FIG. 14 shows the interpolation process of FIG. 13, in which a polygon made from an isoluminance line of a higher level is concave.

On the other hand, as is shown in FIG. 14, processing is carried out in the following way when the figures for the parts split up by the imaginary vectors are concave.

Step 1: The split up figure is divided into a number of convex figures, the respective centers of gravity for these convex figures is found and connections are then made between these centers of gravity (in the example in FIG. 14, $G_1$ and $G_2$ are connected).

Step 2: It is assumed that the line connecting the centers of gravity lies on the plane midway between the isoluminance lines P and Q. Triangularization is then carried out on the concave figure constructed by vectors $r_1'$ to $r_4'$ and the imaginary vectors $I_1$ and $I_2$.

Step 3: The center of gravity G2 near the entrance of the concave figure and the nearest vertex $P_1$ thereto on a lower level isoluminance line are connected. This vertex and the end points of the imaginary vector I1 which have been split up are then connected and triangular processing is carried out.

Step 4: Regarding each of the end points of over vectors, the imaginary vector I1 is regarded as being one vector for the isoluminance line Q, and triangular processing is carried out in the same sequence as for convex only figures.

By using the above process, the intermediate part between the lower level isoluminance line and the high level isoluminance line Q can be completely covered with triangular patches.

Figure 15:
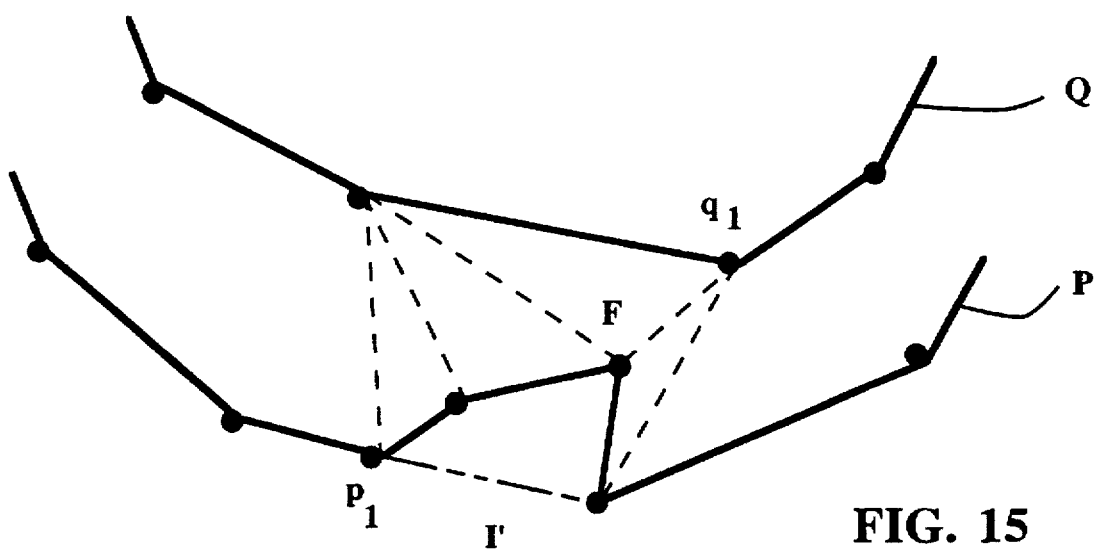
FIG. 15 shows an interpolation process in accordance with the invention, in which a polygon made from an isoluminance line of a lower level is concave.

(b) When a lower level polygon is concave:

As is shown in FIG. 15, when the quadrangular figure made for the lower level isoluminance line is concave, the process is carried out in the following way:

The vertex on the concave figure cut away by the imaginary vector I' which is the furthest away from the imaginary vector I' is found (in the example in FIG. 15 this is the vertex F), and this is connected to its nearest end point of the vector on the isoluminance line Q (this is shown in the figure by q1). Triangular processing for the other vertices for the concave parts is carried out by making connections with the nearest vector end point of those on the higher level isoluminance line Q.

With regard to each of the remaining vector end points, the imaginary vector I' is regarded as being one of vectors for the isoluminance line Q, and triangular processing is then carried out in the same sequence for convex only figures. In this way, the space between the isoluminance line P of the lower level and the isoluminance line Q of the higher level can be completely covered with triangular patches.

(c) When both polygons are concave:

(i) Principle:

When, as is shown in FIG. 16 at (a), the polygons made for the isoluminance lines are concave for both levels, all of the concave parts of the polygons are cut away using the imaginary vectors I and I', so that the polygonal shape is then considered a convex figure. Both end points for the imaginary vectors I and I' are then respectively linked as shown. The same process is then carried out for end points other than these end points as for convex only figures. On this occasion, triangular processing is not carried out on portions which are not triangular (i.e. quadrangles).

After the center of gravity G has been obtained for the concave parts of the polygon on the isoluminance line of the higher level, the level for this center of gravity is regarded as being midway between the isoluminance lines P and Q, and triangular processing is carried out by connecting each of the vertices on the concave parts and the center of gravity. Regarding the concave part on the polygon of the lower isoluminance line, the vertex F furthest from the imaginary vector I', is connected to all of the end points q1 and q2 of vector I and the center of gravity G. In this way, by carrying out triangular processing on the quadrangular portions, the space between the isoluminance line of the lower level P and the isoluminance line of the higher level Q can be completely covered with triangular patches.

(ii) Exceptions:

In cases such as that shown in FIG. 16 at (b), where the center of gravity G for the concave part of the polygon made from the isoluminance line of the higher level is positioned at the outside of the concave part of the polygon made from the isoluminance line of the lower level, and/or where the vectors connecting the vertex F and the vertices q1 and q2 or vectors linking the vertex F and the center of gravity G do not cross the isoluminance line, when the above principle in (i) above cannot be used, the above process is not carried out to obtain a value for the center of gravity G, but, rather the processes in aforementioned (a) or (b) are carried out.

When a bifurcation occurs.

Figure 17:
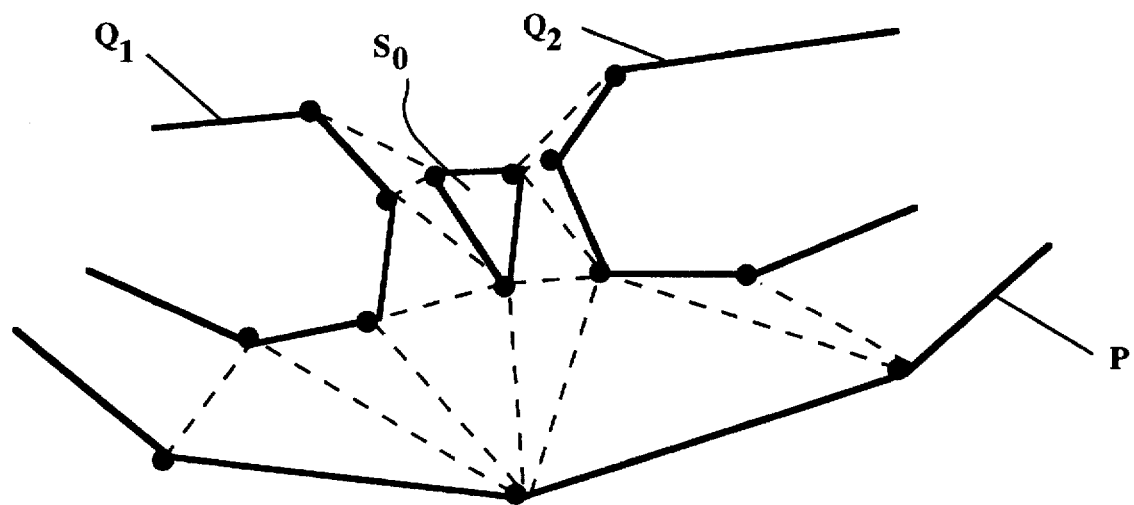
FIG. 17 shows a saddle interpolation process in accordance with the invention.

When a bifurcation occurs between one level and the level subsequent thereto, it is necessary to carry out processing on the bifurcation saddle. Various methods can be adopted as the saddle restoration algorithm for determining whether or not saddle information is included in the encoding data but here, the following two typical examples are described:

(a) Methods using the shape of the encoded saddle:

An algorithm that carries out restoration using information related to the shape of the saddle detected in the encoding process is now described. As is shown in FIG. 17, the isoluminance lines of each level and the shape of the polygonally approximated saddle are used and the space between them is covered with triangular patches. In the following, an operation has to be carried out in such a manner that the vertices on the isoluminance lines P, $Q_1$, and $Q_2$ and the polygon $S_0$, which approximates the luminance saddle, are linked together without crossing $Q_1$, and $Q_2$ and $S_0$.

Step 1: The vectors on the isoluminance lines Q1 and Q2 of the higher level which are the closest to each of the vertices of the polygon ($S_0$ in FIG. 17) which approximates the saddle are found, and these vertices and the vector end points are connected.

Step 2: Each of the vertices on the polygon $S_0$ which approximates the saddle is connected to its nearest vertices on the isoluminance lines of the lower level P.

Step 3: Each of the vertices on the isoluminance line of the lower level is connected to its respective nearest points on the isoluminance line of the higher level.

Step 4: The vertices on the isoluminance line for the higher level which were not processed in Step 3 are connected to their respective nearest points on the isoluminance line for the lower level.

Step 5: When a figure made in the way described above is not triangular (when it is quadrangular), a triangle is formed by making a link across the shortest of the diagonal lines. It is also possible, when the figure made in the way described above is not triangular, to process the quadrangular patches without modification in the same way as described above for convex only figures.

(b) Method to estimate the luminance saddle point:

When saddle information is not included in the encoding data, a typical point for the saddle part is estimated from the shape of the isoluminance line of the higher level already restored, and the space between this point and the two levels is then covered with triangular patches.

Figure 18:
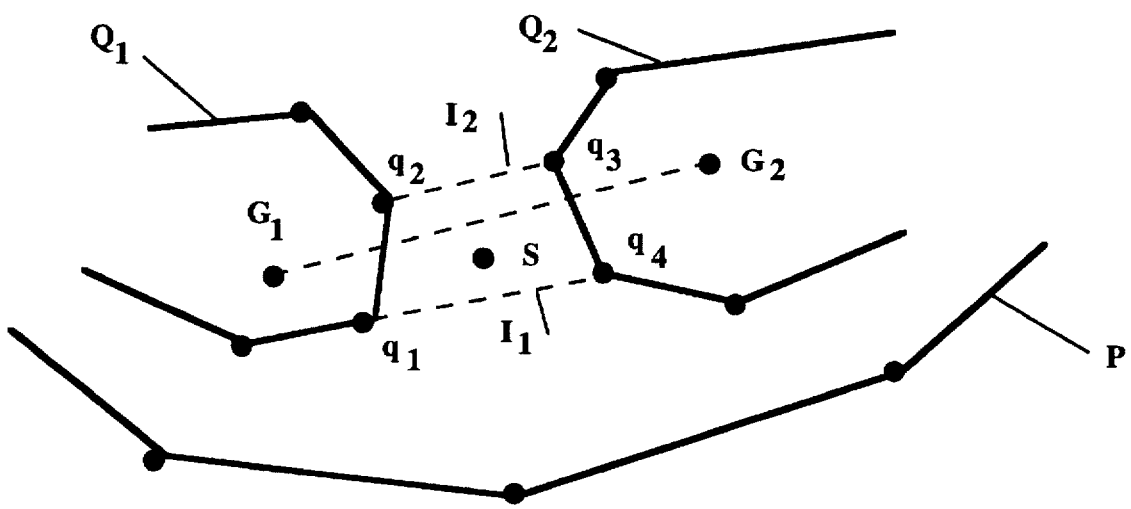
FIG. 18 shows a method for estimating the saddle point in accordance with the invention.

The method for estimating the luminance saddle point is shown in FIG. 18. With the bifurcation, when the centers of gravity $G_1$, and $G_2$ for the polygons made using the isoluminance lines are linked, the end points $q_1$, $q_4$, $q_2$, and $q_3$ of the two vectors intersected by this link are connected using the imaginary vectors $I_1$ and $I_2$, and the center of gravity of this quadrangle made of said two vectors $I_1$, and $I_2$ is taken as being a typical point (luminance saddle point S) for the saddle part. The level of this saddle point is then taken as being at the midway point between the isoluminance lines P and Q.

Figure 19:
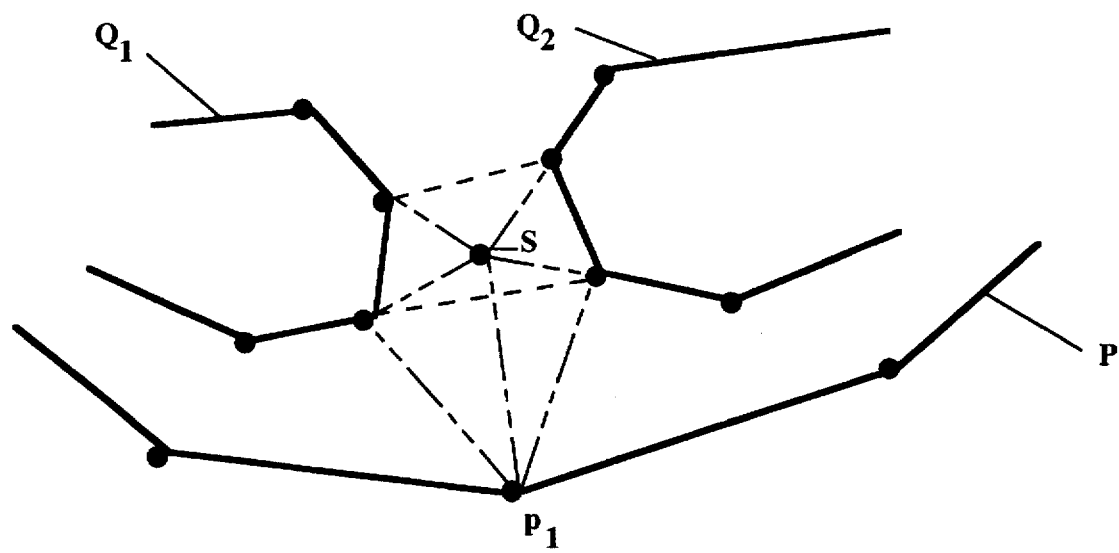
FIG. 19 shows a method for restoring a decoded saddle, based on an estimated saddle point in accordance with the invention.

The bifurcation of the saddle part is restored in the following sequence based on the estimated saddle point S, as shown in FIG. 19.

Step 1: The saddle point S and both end points of the imaginary vectors $I_1$ and $I_2$ used in the estimation are linked.

Step 2: The saddle point S and the nearest vertex p1 thereto on the isoluminance line P of the lower level are linked.

step 3: The vertex selected in the lower level in Step 2 and the end points $q_1$ and $q_4$ of the imaginary vector $I_1$ used in the assumption of the saddle point are linked.

Step 4: Each of the vertices on the lower level polygon are linked to their nearest vertices on the higher level polygon.

Step 5: Vertices on the higher level polygon which were not processed in Step 3 are linked to their nearest vertices on the lower level polygon. Step 6: When a figure made in the above way is not triangular (when it is a quadrangle), triangularization is carried out by linking the shortest of the diagonal lines.

Peak Processing.

Figure 20:
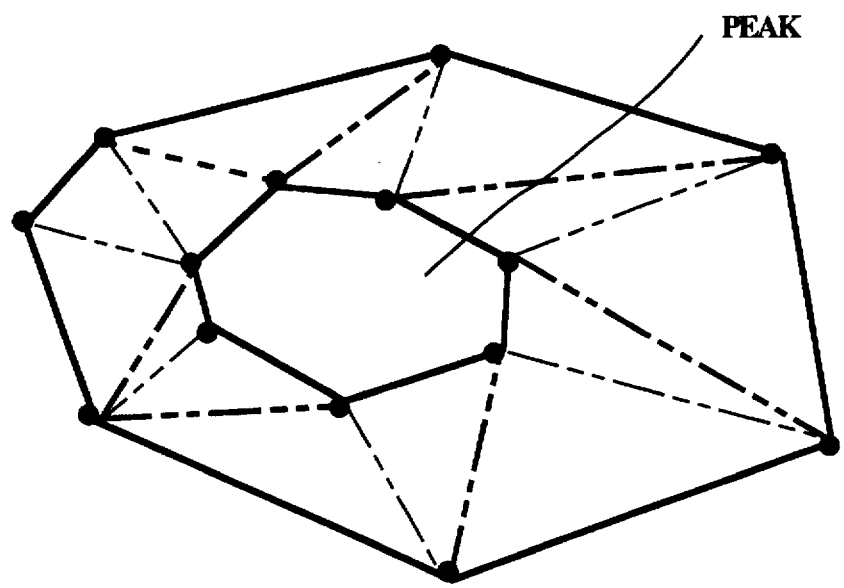
FIG. 20 shows a peak restoration and estimation method in accordance with the invention.

With regard to a peak, as is shown in FIG. 20, the process of triangularization is the same as that for convex figures only, or, when at least one of the polygons is concave. In the above process, after the image has been restored to its original three-dimensional shape, the luminance value can be calculated for each of the picture elements and restoration of the image data becomes possible.

(3) Slice level selection:

Slice level selection methods are now described for when the isoluminance lines are made from the original image. Various methods can be adopted in accordance with requirements, such as the image type and picture quality demanded by fields of utilization of the image. However, here, the following two examples are explained as being typical:

Method 1.

A histogram of frequency with respect to luminance level is made, and slices (levels) are then selected as the most frequent levels in the histogram. With this method it is possible to select slice levels adapted to individual pictures, then this slice selection method is fit for expressing still images where the quality demanded is comparatively high.

Method 2.

Taking into consideration the sensitivity of peoples eyes, the number of slice levels and the level value are given independently of images so that the greater level spacing is in a lower luminance region. It can be expected that the picture quality achieved with slice levels selected by this method is not better when compared with one in Method 1. On the other hand, this method can be considered to be suitable for the encoding of pictures, such as moving pictures, as the slice level is decided without taking the image into account. This method has an advantage when applied to moving pictures in that, since taking into account the characteristics of the human eye with regard to movement, higher image quality than in still images is not required, and it is apparent that this method is useful for a high speed search for corresponding points between two successive frames.

An encoding algorithm for moving pictures is given in more detail.

(4) Encoding parameter selection:

As described above in (1), there are various kinds of encoding parameters for the encoding in accordance with the invention, and it is possible to control the encoding performance by adjusting these parameters appropriately.

s: The number of slice levels made when isoluminance lines are made from the source image.

v: The number of sub-levels made when further slices are made between the levels for the isoluminance lines for detecting peaks and saddles.

approximation of isoluminance lines: The parameter for deciding to what extent the isoluminance lines obtained by the slicing should be approximated.

peak and saddle shape: Because the shapes of the peaks and saddles are related to the restoration of the texture of the image, this parameter determines to what extent these shapes should be approximated.

peak and saddle level: This is a parameter or changing over between assigning the actual value to the peak and saddle levels and, when they are close to a slice level, deciding one of the levels is the level thereof.

Figure 21:
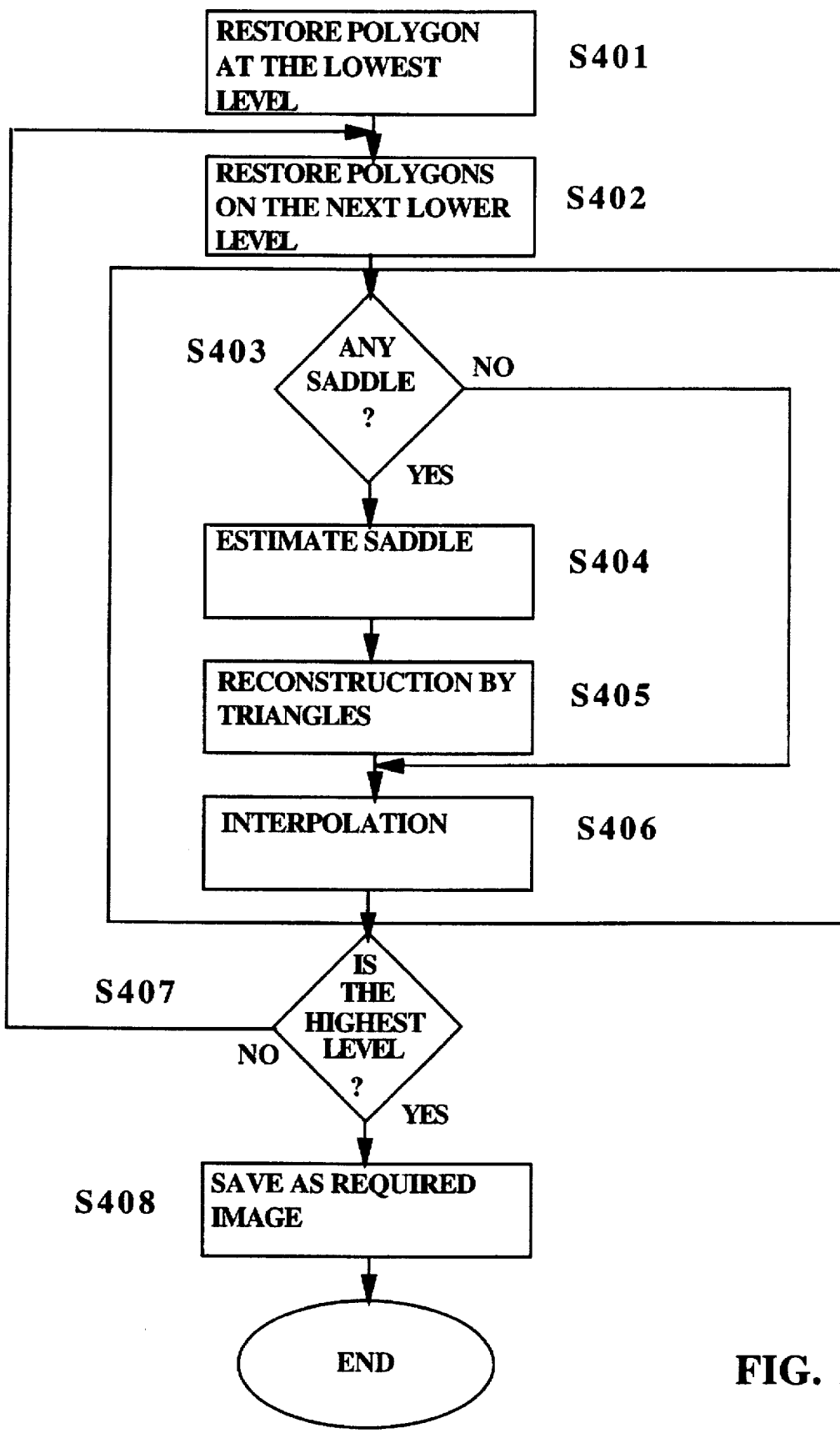
FIG. 21 is a flowchart that shows a luminance restoration method in accordance with the invention.

A detailed description of the decoding process for luminance is shown in FIG. 21. In this figure, referring to the level number for the bitstream shown in FIG. 11, restoration (S401) is carried out on the vector code for the isoluminance line occurring at the lowest level (for example, level 1). Then, restoration is carried out (S402) for the isoluminance line occurring at the next level (for example, level 2). Here, it is determined whether or not a saddle is present (S403). The process is then different depending on whether or not the data written into the bitstream relating to the saddle contains data showing the shape.

In this example, consider where the saddle data does not contain data pertaining to the shape. When there is a saddle present, a saddle point is estimated (S404), and reconstruction is carried out using the triangular patch attached near to the saddle (S405). After this, further reconstruction is carried out using interpolation processing in accordance with the shape of the figure made from the restored isoluminance line (S406). When there is no saddle present, the process goes directly to the step (S406). The process at the steps (S403 to S406) is then carried out for each of the isoluminance lines. After this, it is determined whether or not the highest level has been reached (S407). If the highest level has not yet been reached, the process goes back to the step (S402). If, however, the highest level has been reached, this restored data is saved as image data at the necessary resolution (S408) and the decoding process is complete.

(5) Applications to motion pictures:

The above description was given with regard to a still object image, but the invention can also easily be applied to motion pictures. That is, the invention provides an efficient format (e.g. a format that is not limited by resolution) that does not rely on the input/output device for the motion video data.

Encoding of Motion Information.

A basic idea is to detect motion of an object in a video sequence by counting displacement of polygons composed of all isoluminance lines over time and then to express such information in vector form. The information relating to motion is then defined as parallel translation and rotation of polygons. This process is operated on a unit which is composed of an ordered series of images, i.e. a batch of frames in a prescribed duration of time. The objects of this operation include avoidance of the accumulation of errors related to this motion information and realization of reverse playback. Also, scene changes happen in a sequence, but at this time processing is newly carried out on a new series of images.

Figure 22:
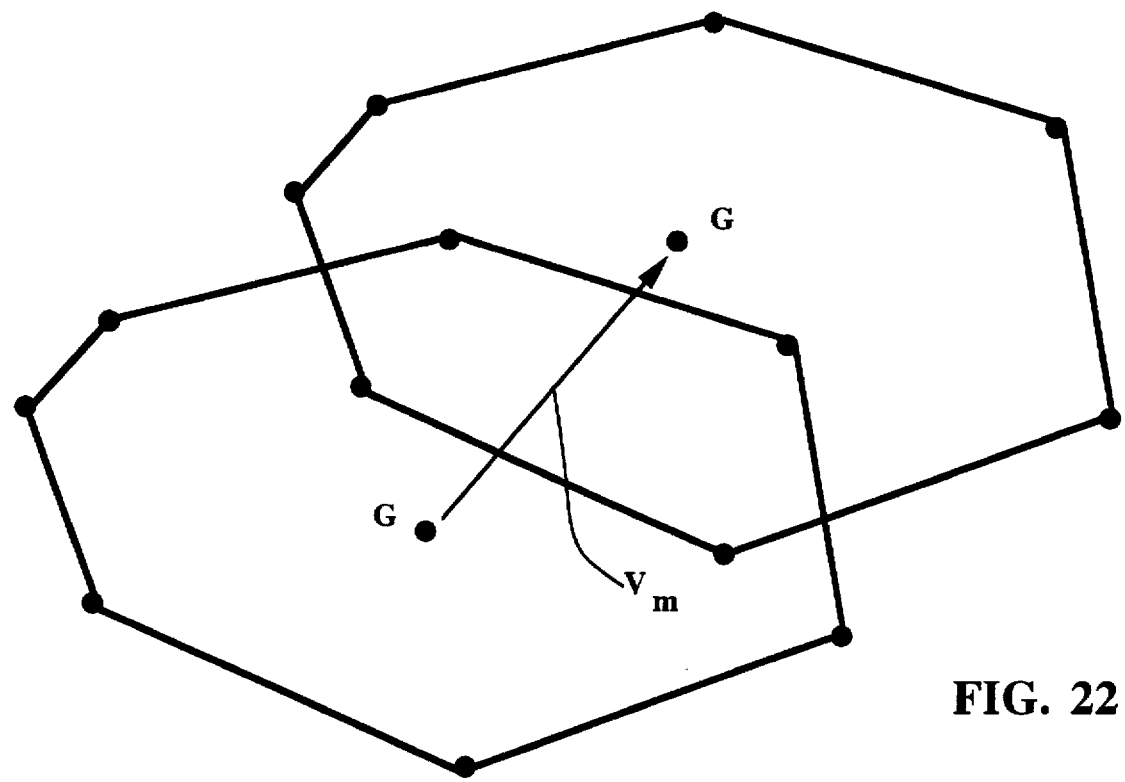
FIG. 22 shows the application of a motion vector relating the translation of a polygon made from an isoluminance line to an animation in accordance with the invention.

First, the leading frame of the image series is processed in the same manner as that for a still image, and resultant information is coded as the initial conditions relating to the isoluminance lines. Next, as is shown in FIG. 22, isoluminance lines that correspond to two successive frames are searched for, and the centers of gravity of polygons made of these isoluminance lines are obtained. A motion vector Vm relating to the translation of the polygon is then calculated from the amount of translation of the center of gravity. Geometrical features, such as the surface areas of the polygons and the distance between the centers of gravity, can be used in the search. The calculation is based on the assumption that as the spacing of the time periods for successive frames is small, the motion of the object and its deformation are sufficiently small.

Figure 23:
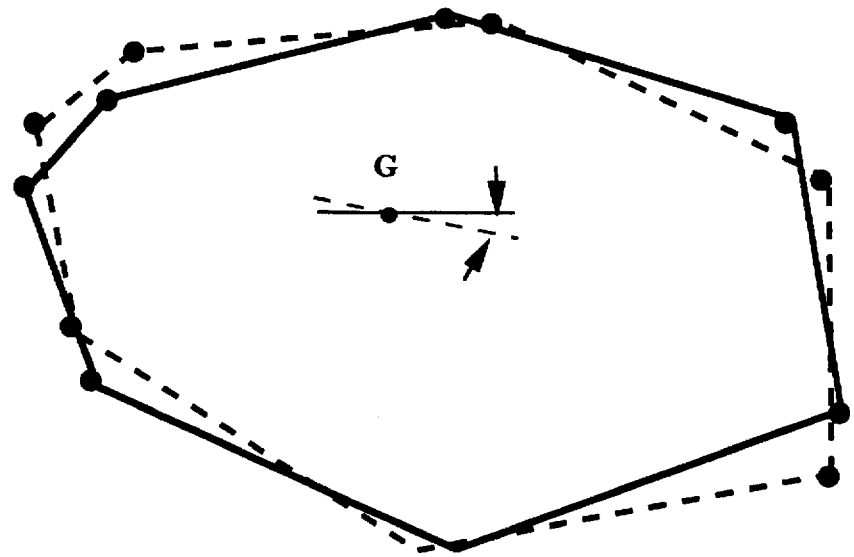
FIG. 23 shows the application of a method for extracting information relating to the rotational movement of a polygon made from an isoluminance line to an animation in accordance with the invention.

Information relating to the rotational motion for the polygon is extracted. As is shown in FIG. 23, the centers of gravity G of the polygons made of the isoluminance lines corresponding to the two successive frames are made coincident to each other, and the polygons are then mutually rotated taking the center of gravity G as the center to obtain an angle at which the overlapped area of two polygons are maximized.

The translational and rotational motion of the polygon calculated in this way is then taken as being the motion information for the object and is encoded. Also, if a suitable candidate cannot be found as a result of the polygon search, it is taken that a scene change has occurred, a new image series is taken for the following frame, and the encoding of the overall image starts again.

It is necessary to search for correspondences between frames when encoding motion pictures. At this time, if the slice level is selected from the image histogram, the slice level changes frame by frame and eventually consistency in the correspondence search process is lost. It follows that a method where the slice level is decided beforehand is appropriate, as described in Method 2 in the aforementioned (3) relating to the selection of slice levels.

Reverse playback algorithm.

Figure 24:
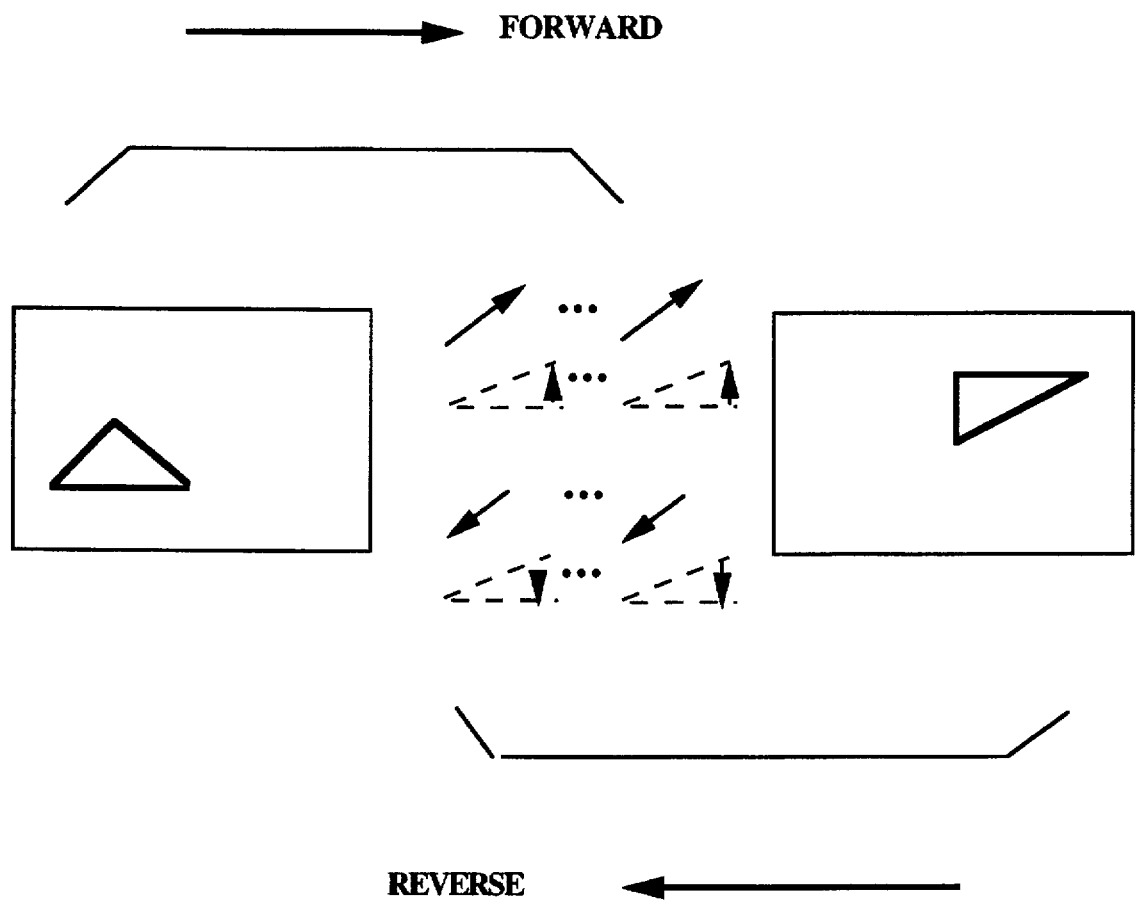
FIG. 24 shows the application of a reverse playback algorithm to an animation in accordance with the invention.

When this method is applied to motion pictures, one of its characteristic functions is that video reverse playback is possible. This can be achieved by changing the order of reconstruction of the series of images which is introduced in the encoding. FIG. 24 shows the concept of the reverse playback algorithm.

In FIG. 24, when playing back in "Forward", the series of images is decoded from the information related to the initial conditions of the series of images and the motion (translation and rotation). On the other hand, when playing back in reverse, as shown in FIG. 24, the construction of the series of images is changed, I.e. a new series for reverse playback is created from the initial conditions for a series of images and information pertinent to the motion in the previous series of images.

The vectors showing the translation operation and the rotational direction in which the rotational movement operation occurs are shown in FIG. 24 by shaded arrows for the forward direction and unshaded arrows for the reverse direction.

The above method is used while a scene change does not occur. However, if a scene change does occur, the processing of this frame is skipped and the process returns to a point where the motion is smooth, and playback then starts.

Figure 25:
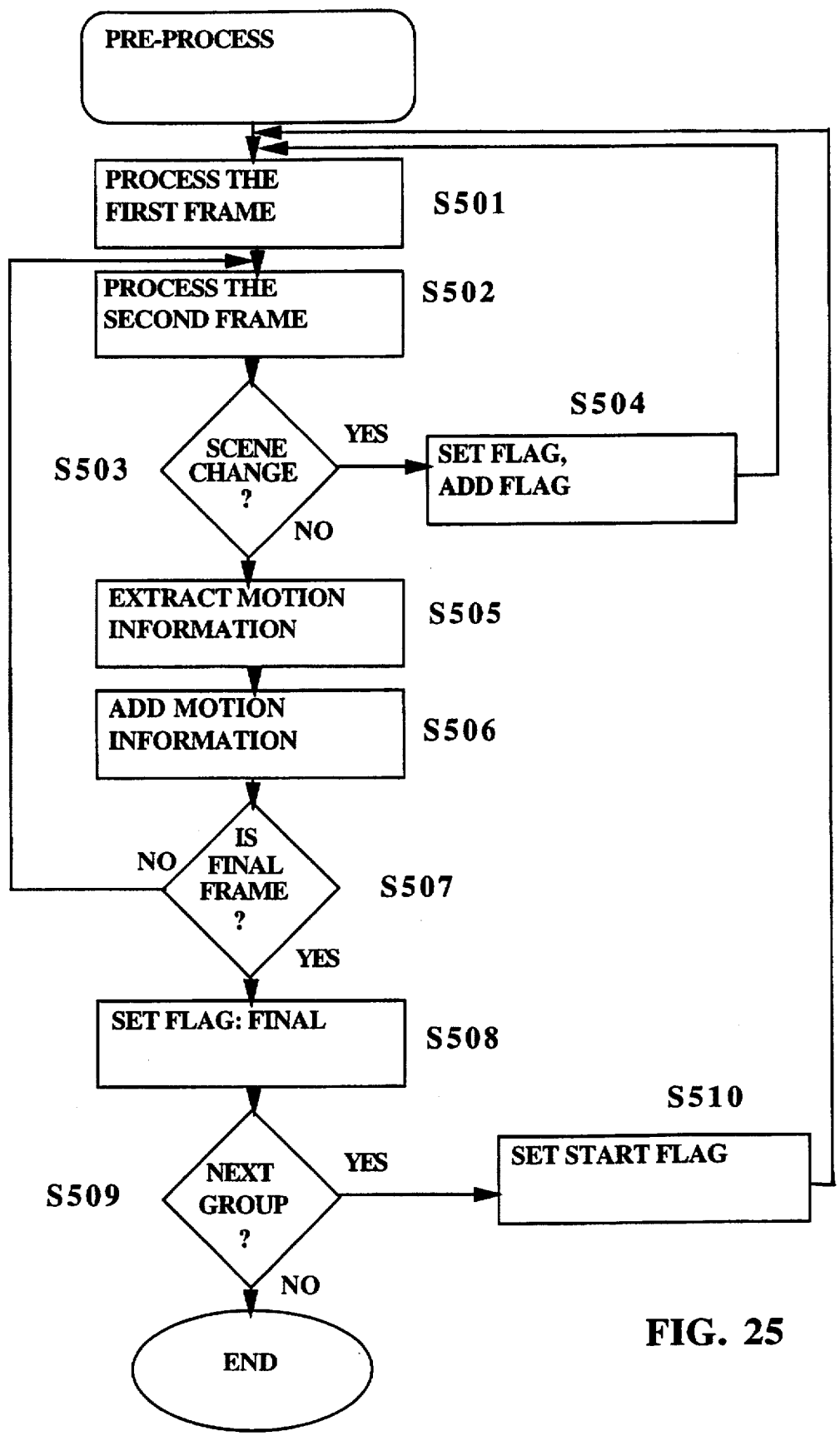
FIG. 25 shows a more detailed description of the animation encoding process in accordance with the invention.
Figure 26:
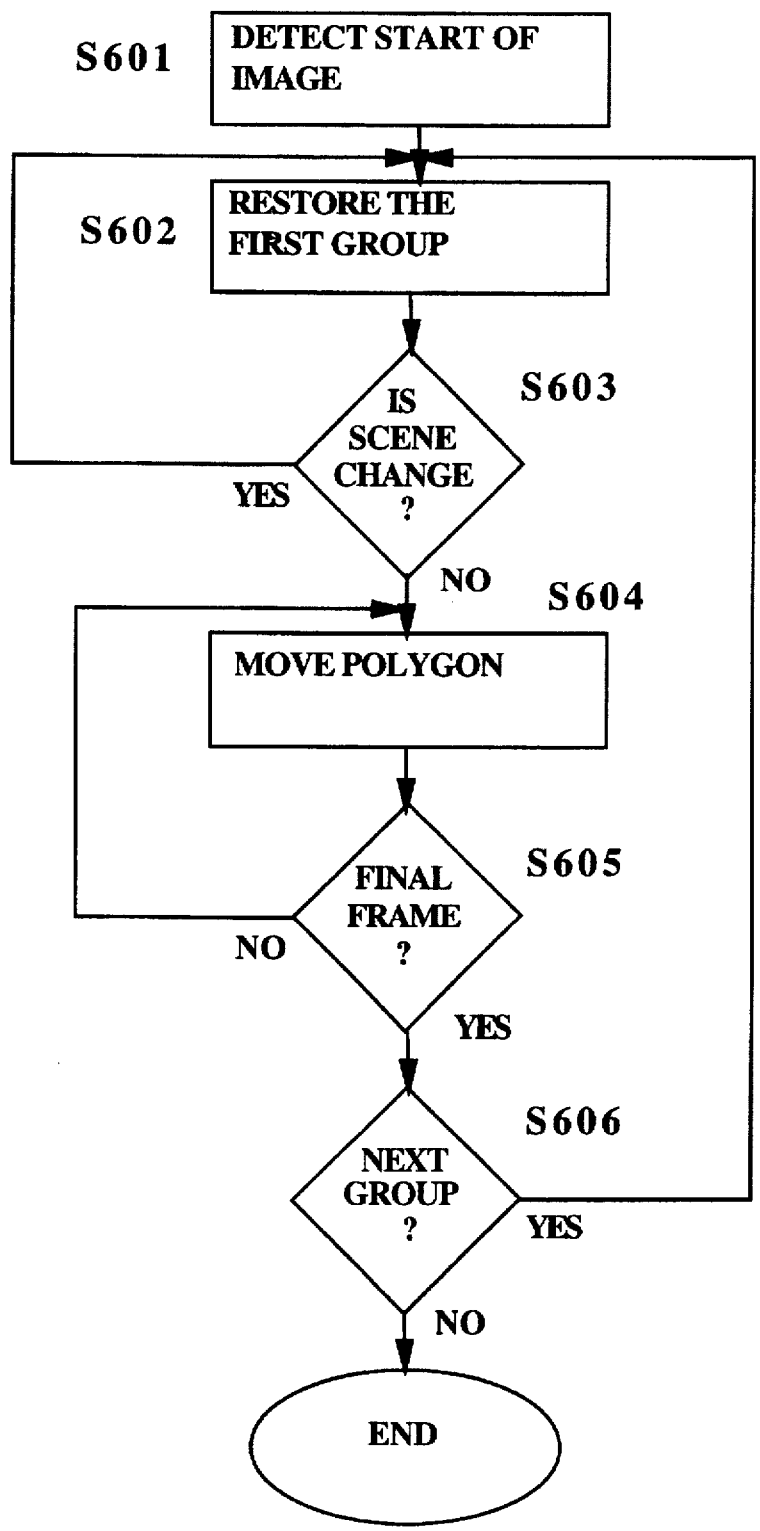
FIG. 26 shows a more detailed description of the animation restoration process in accordance with the invention.
Figure 27:
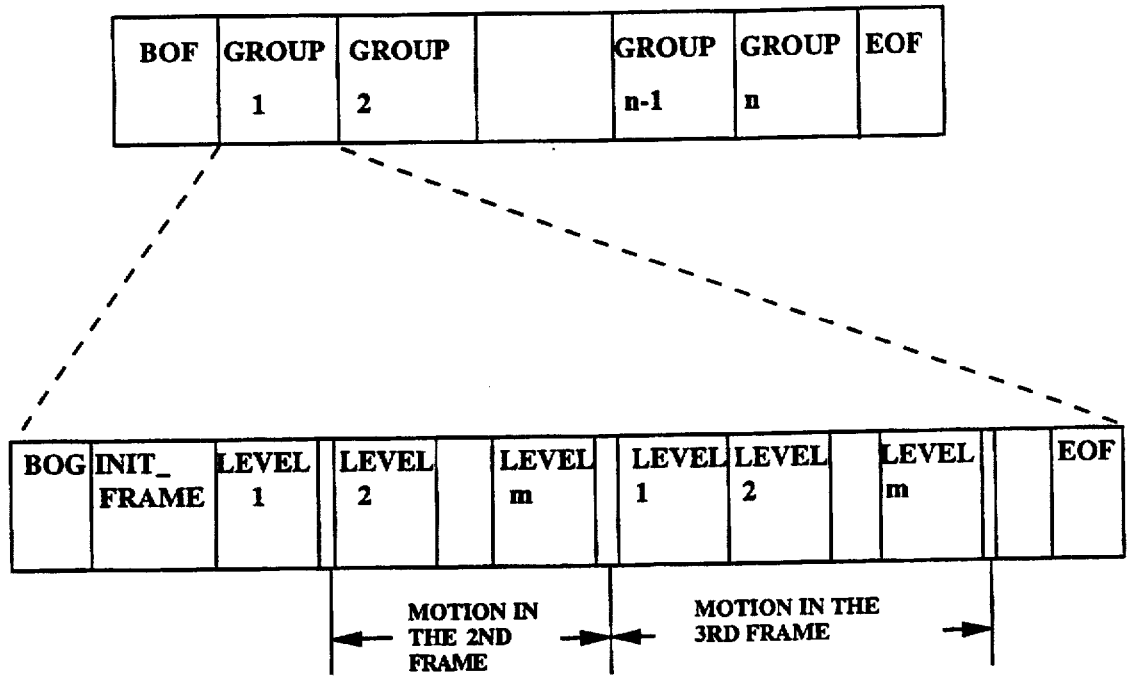
FIG. 27 shows an example of a bitstream in the animation encoding process in accordance with the invention.

Referring to FIGS. 25 and 26, the encoding and decoding processes for the luminance in a video sequence are described in detail. With regard to the encoding process, as is shown in FIG. 25, the first frame of the group is processed in the same way as for a still image, and a bitstream of the kind shown in FIG. 27 is generated (S501). The isoluminance lines occurring at each of the luminance levels for the next frame are then made (S502). In FIG. 27, the motion information is made up of groups 1 to N, and each group is made up of a first frame (INIT_FRAME), second frame, third frame . . . k-th frame.

It is then determined whether or not there is a scene change present. If there is a scene change present, a scene change present flag is added to the bitstream, and the process returns to the step (S501). If there is no scene change present, the motion information for the polygons made of the isoluminance lines occurring at each level (S505) and the motion information is added to the bitstream (S506, please refer to FIG. 27).

After this, it is determined whether or not the frame currently being processed is the final frame in the group (S507). If it is not the final frame in the group, the process returns to the step (S502). If it is the final frame in the group, a flag indicating the end of the group is added (S508, please refer to FIG. 11 ). It is then determined whether or not there is another group (S509). If there is another group, a start flag for the next group is added to the bitstream (S510, please refer to FIG. 11 ), and the process returns to the step (S501). If there is no next group, then the process is ended.

In the decoding process, as is shown in FIG. 26, the start of the video data is first detected (S601) and the first frame of the group is decoded using the decoding algorithm for a still image (S602). It is then determined whether or not there is a scene change flag (S603). If there is a scene change flag, the process returns to the step (S602). If there is no scene change flag, the polygon made of the isoluminance line is moved in accordance with the motion information (S604).

After this, it is determined whether or not the frame being processed is the final frame of the group (S605). If it is not the final frame in the group, the process returns to the step (S604). If it is the final frame, it is then determined whether or not there is another group (S606). If there is another group, the process returns to the step (S602). If there is no other group, then the process is complete.

Next, an embodiment comprising processes (1) to (N) is explained, where the curved surfaces for the luminance are recursively sliced.

Figure 28:
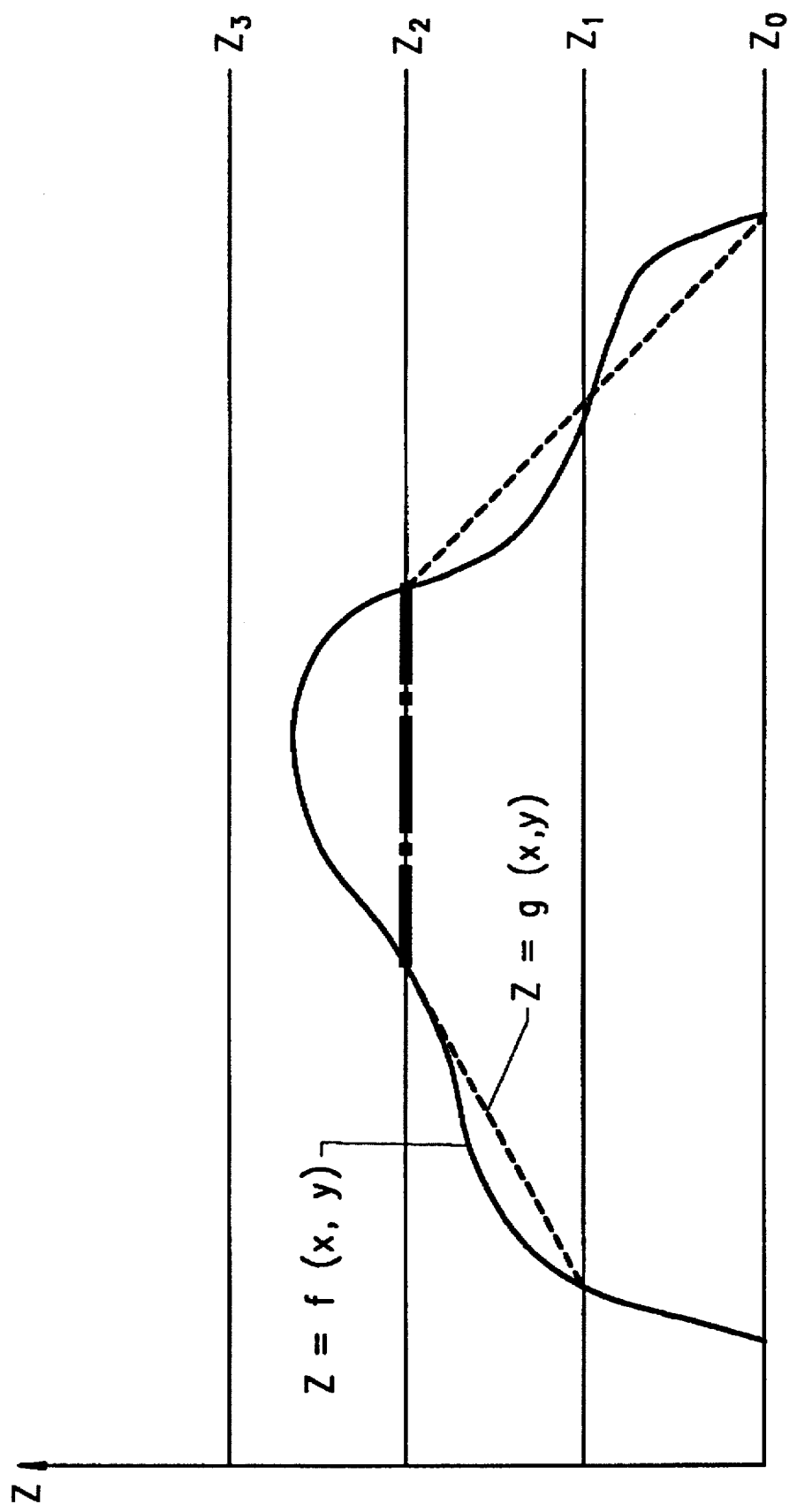
FIG. 28 shows slicing of the luminance curved surface in accordance with the invention.

(1) As shown in FIG. 28:

1) The distribution of the luminance of the source image can be expressed by the three-dimensional curved surface $z=f(x,y)$;

2) Isoluminance lines are made by slicing this at a wide spacing (in this figure, four levels Z0 to Z3 are shown as the slice levels).

Then,

3) A polyhedron $z=g(x,y)$ is made from these isoluminance lines using the decoding method already described (the dotted line in the figure).

(2)

Figure 29:
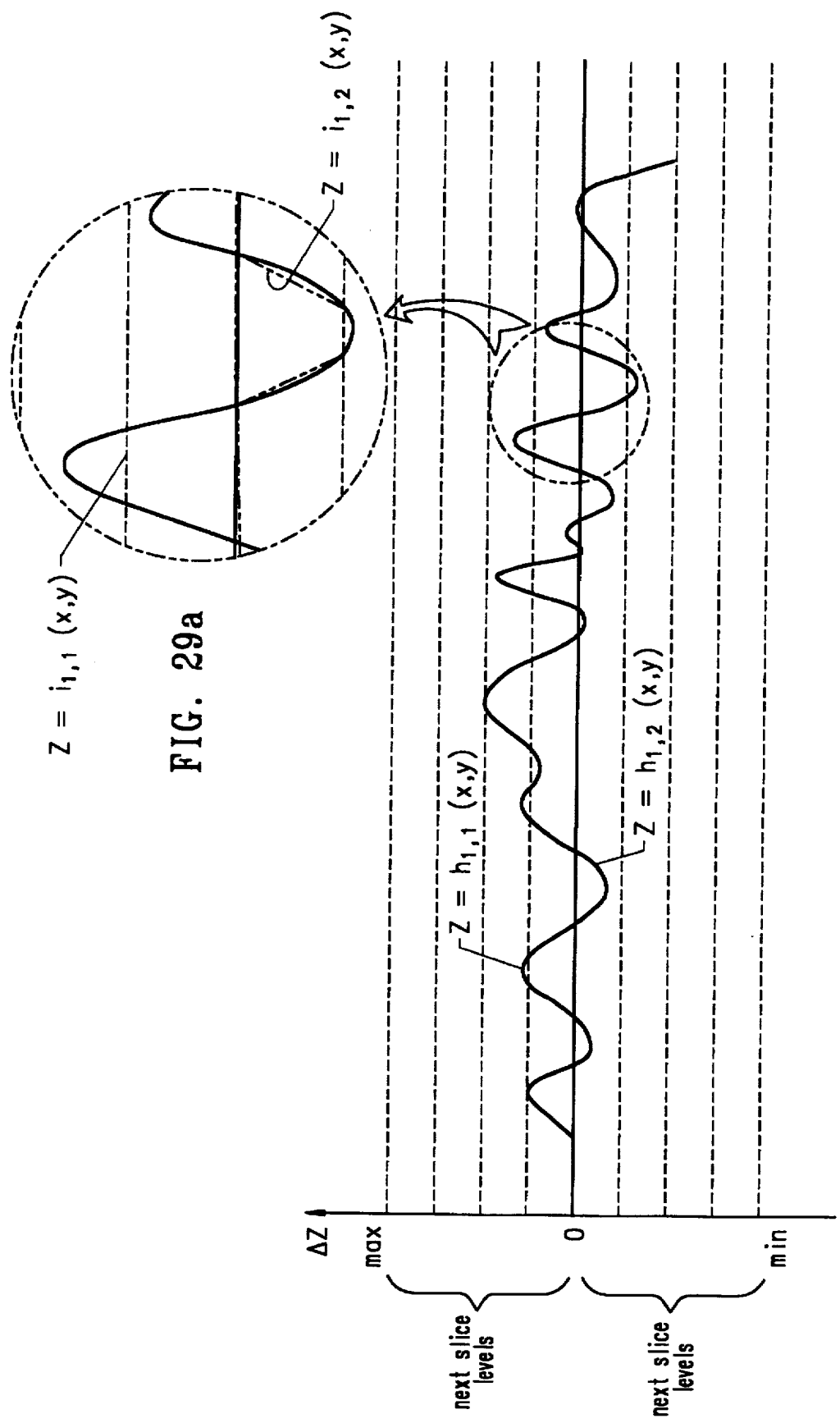
FIG. 29 shows the error Dz in the z-axis component of the embodiment of the invention shown in FIG. 28.

1) The error curved surfaces $z=h_{1,1}(x, y)$, and $z=h_{1,2}(x,y)$ corresponding to the positive and negative values for $\Delta z$ ($=g(x,y)-f(x,y)$) are respectively obtained by computing the error $\Delta z$ in the z-axis component for the curved surface $z=f(x, y)$ and the polyhedron $z=g(x, y)$. These error curved surfaces are $z = g(x,y)-f(x,y)$ shown in FIG. 29. The maximum (max) and minimum (min) values for the error z are also shown in FIG. 29.

Then,

2) The error curved surfaces $z=h_{1,1}(x,y)$ and $z=h_{1,2}(x,y)$ are derived based on the equal difference luminance lines (in the figure, this is shown by the four positive and four negative levels as slice levels);

3) Polyhedrons $z=i_{1,1}(x,y)$ and $z=i_{1,2}(x,y)$ are then made from above error curved surfaces using the aforementioned decoding method (the dotted line in the figure).

In the same way (but not referring to the drawings):

(3)

1) The error curved surface $z=h_{2,1}(x,y)$, $z=h_{2,2}(x,y)$ is obtained by calculating the z-axis error it $I_{1,1}(x,y)-h_{1,1}(x,y)$ from the error curved surface $z=h_{1,1}(x,y)$ and the polyhedron $z=i_{1,1}(x,y)$, and the z-axis error $i_{1,2}(x,y)-h_{1,2}(x,y)$ from the error curved surface $z=h_{1,2}(x, y)$ and the polyhedron $z=i_{1,2}(x, y)$ 2) Each of the error curved surfaces $z=h_{2,1}(x,y)$, $z=h_{2,2}(x,y)$ is expressed and coded based on equal difference luminance lines.

3) Corresponding based polyhedron $z=i_{2,1}(x,y)$ and $z=i_{2,2}(x,y)$ are then made using the aforementioned decoding method.

(N)

1) By computing the error $i_{N-2}(x,y)-h_{N-2,1}(x,y)$ in the z-axis component from the error curved surface $z=h_{N-2,1}(x, y)$ and the polyhedron $Z=i_{N-2,1}(x,y)$, and the error $i_{N-2,2}(x, y)-h_{N-2,2}(x,y)$ in the z-axis component from the error curved surface $Z=h_{N-2,2}(x,y)$ and the polyhedron $Z=i_{N-2,2}(x,y)$, the error curved surface $Z=h_{N-1,1}(x,y)$, $z=h_{N-1,2}(x,y)$ which correspond to the positive and negative values of these errors can be obtained.

2) These error curved surfaces $z=h_{N-1,1}(x,y)$, $z=h_{N-1,2}(x, y)$ can then be expressed using the equal difference luminance lines.

As the absolute values of the errors $\Delta z$ obtained in each stage of the processes (2) to (N) progressively become smaller, complex luminance patterns are preserved without deterioration to be stored and transmitted as image data. Also, it is possible to carry out, for example, lossless encoding using a DPCM (Differential Pulse Code Modulation) algorithm.

Figure 30:
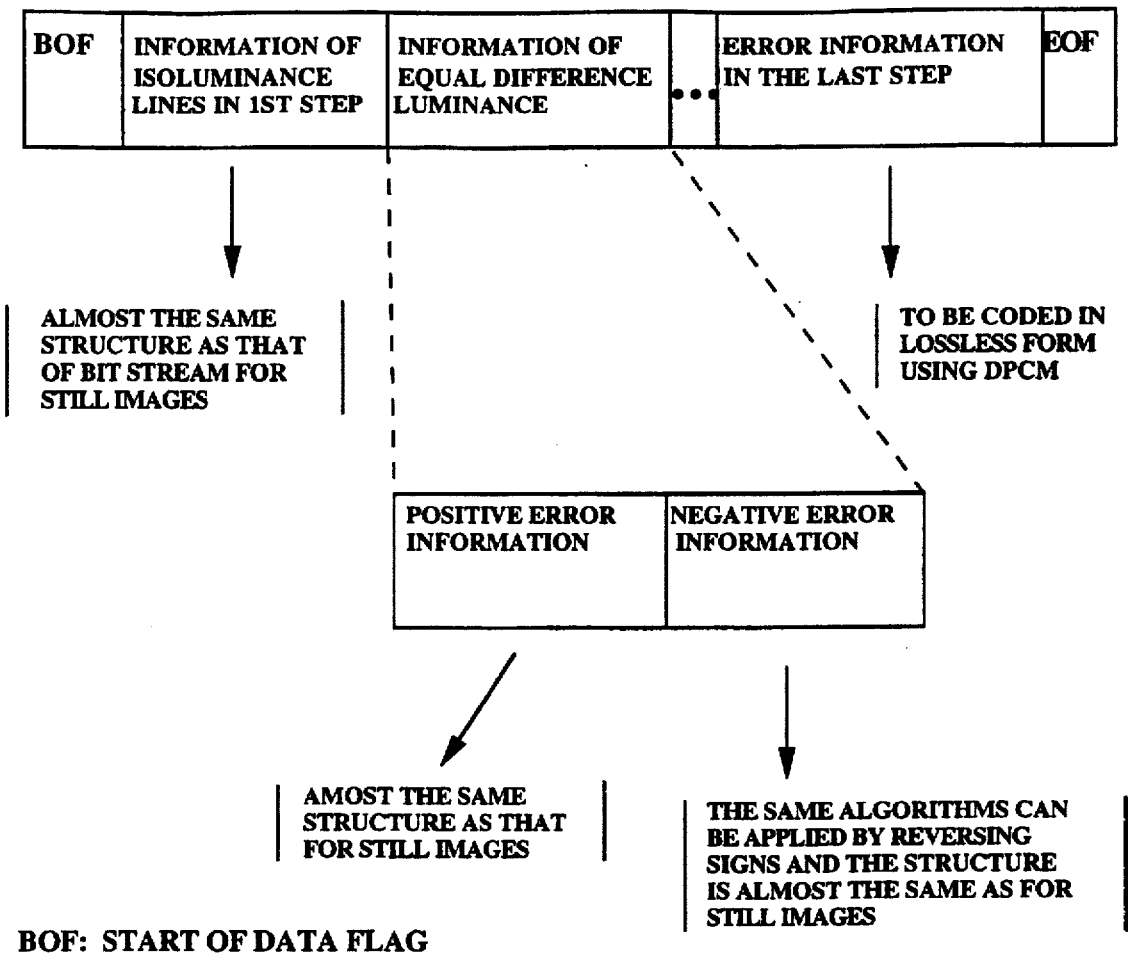
FIG. 30 shows an example of the bitstream in accordance with the encoding process of the embodiment of the invention shown in FIG. 28.

FIG. 30 shows an example of a bitstream for one embodiment of this invention. The structure of the bitstream shown in this figure is an abbreviated version of the structure shown in FIG. 11. The above image data are restored by successively adding errors restored based on said equal difference luminance lines given in processes (2) to (N) to the luminance restored based on the isoluminance line in process (1), up to errors in process (j) ($2 \leq j \leq N$).

Effects of the Invention.

If this invention is constructed as is described above, it attains the following effects:

(1) The expression method for the source image does not depend on the spatial resolution (or number of picture elements) specified by the source image input device.

(2) Because this is not a process that takes place block by block, inter-block distortions do not occur in the restored image.

(3) Scale ability is enhanced because the encoding and decoding are based on a coordinate system which is independent of the spatial resolution of the various devices.

(4) The present invention is easily applicable to motion video coding.

(5) Because a curved surface having a feature value in the direction of the z-axis is made and then recursively sliced, the feature can be approximated in stepwise precision from coarse to fine.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

We claim:

1. A method for image transmission and/or storage, said method comprising the steps of:
   expressing image data, wherein said image data spreads over a two-dimensional figure on an x-y plane accompanied by a data image pixel feature in a third dimension z, said expressing step comprising the steps of:
      providing a three-dimensional (x-y-z) curved surface $z=f(x,y)$ where f is a single valued function;
      slicing said curved surface to obtain cross-sectional areas that are perpendicular to said z-axis at $z=z0, z1, z2, \ldots, zN$, where N is zero or a positive integer;
      creating at least one polygon that approximates contours of said cross-sectional areas;
      vector coding said at least one polygon;
   restoring said image data from said at least one vector coded polygon as a polyhedron $z=g(x,y)$;

computing a first error curved surface $z=g(x,y)-f(x,y)=h(x,y)$;

slicing said first error curved surface to obtain cross-sectional error areas perpendicular to said z-axis at a predetermined plurality of levels;

creating error polygons that approximate contours of said cross-sectional error areas;

vector coding said polygons; and repeating said restoration, computation, slicing, creation, and vector coding steps recursively for a predetermined time, where a value $f(x,y)$ is replaced by a previously computed value $h(x,y)$, and a value $h(x,y)$ is successively replaced by a previous value $h(x,y)$ in said computation.

2. The method of claim 1, wherein said error curved surface $z=h(x,y)$ is split into a non-negative valued function $z=h1(x,y)$ and a negative valued function $z=h2(x,y)$.

3. A method for restoring image data, wherein said image data is spread on an x-y plane of an x-y-z coordinate system and forms a curved surface $z=f(x,y)$, the method comprising the steps of:

providing an input set of polygons that respectively approximate contours of cross sectional areas that are perpendicular to a feature axis (z-axis) at mutually different levels; and connecting mutually adjacent polygons by plane patches.

4. The method of claim 3, wherein said providing step further comprises the steps of:

providing one of said polygons; and modifying said one of said polygons by subtracting errors in coding to said polygons.

5. The method of claim 3, wherein said connecting step further comprises:

estimating a saddle point of a bifurcation on said curved surface.

6. A method for expressing and restoring an image, comprising the steps of:

representing said image as a two-dimensional figure in which image pixels accompany corresponding feature values to form a three-dimensional curved surface in which the z-axis in an x-y-z coordinate system is a feature axis;

slicing said curved surface to obtain contour lines that are perpendicular to said z-axis at a plurality of z values;

transmitting data relating to said contour lines;

receiving and approximating each of said contour lines to corresponding polygons that approximate said contour lines; and paving a region between two mutually adjacent polygons by plane patches.

7. A method for expressing motion in a video sequence, comprising the steps of:

representing a series of frames, each of said frames including a time stamped image at a time instant, wherein said time stamped image is represented by a curved surface in a three-dimensional x-y-z coordinate system in which said time stamped image is figured on an x-y plane and a feature of said time stamped image is measured on a z-axis;

slicing each said curved surface to obtain a cross-sectional area perpendicular to said z-axis at a level on said z-axis;

computing a center of gravity of corresponding to each of said cross-sectional areas in at least two of said time stamped images;

translating said cross-sectional area from locations of said centers of gravity based on said video sequence;

moving one of said cross-sectional areas along said translation to reach coincidence of a center of gravity of said one cross-sectional area with a center of gravity of another corresponding cross-sectional area;

rotating said one of said cross-sectional areas around said common center of gravity to obtain a maximum overlap on said another corresponding cross-sectional area; and determining rotation of said cross-sectional area from an angle of rotation.

8. A method for expressing image data, comprising the steps of:

assigning a distribution of feature values to each pixel in a two-dimensional image space;

representing said pixel feature values by contour lines formed on a curved surface in a three-dimensional space on a Z-axis; and reproducing said curved surface as a polyhedron by feature interpolation of regions between said contour lines and of regions in which peaks or saddles exist without coinciding contour lines.

9. The method of claim 8, wherein said curved surface is reproduced as a polygon by covering said regions between contour lines with any of triangular and quadrangular patches to interpolate feature values.

10. A method for expressing image data, comprising the steps of:

assigning a distribution of feature values to each image pixel in a two-dimensional image space, wherein said feature is represented by contour line formed on a curved surface in a Z-axis of a three-dimensional coordinate system; and forming each of equal difference lines on a first error curved surface to a k error curved surface (k=3, 4, ..., N), said equal difference lines formed on said k error curved surface having a Z-axis error value based on (k−1) equal difference lines.

11. A method for expressing image data providing the steps of:

providing a curved surface $z=f(x, y)$ having feature values of said image in a Z-axis direction;

representing said curved surface $z=f(x, y)$ by contour lines;

forming a polyhedron $z=g(x, y)$ by either reproducing said curved surface as a polyhedron by feature interpolation of regions between said contour lines and of regions in which peaks or saddles exist without coinciding contour lines, or by covering said regions between contour lines with any of triangular and quadrangular patches to interpolate feature values;

computing errors in a Z-axis component of said polyhedron $z=g(x, y)$ to said curved surface $z=f(x, y)$;

obtaining curved surfaces $z=h_{1,1}(x, y)$ and $z=h_{1,2}(x, y)$, respectively corresponding to positive and negative values of said errors;

representing said error curved surfaces $z=h_{1,1}(x, y)$ and $z=h_{1,2}(x, y)$ by equal difference lines;

creating polyhedrons $z=i_{1,1}(x, y)$ and $z=i_{1,2}(x, y)$;

computing errors in Z-axis components of the polyhedron $Z=i_{k-1,1}(x, y)$ to the error curved surface $Z=i_{k-2,1}(x, y)$, and errors in Z-axis components of the polyhedron $z=i_{k-1,2}(x, y)$ to the error curved surface $z=h_{k-2,2}(x, y)$;

obtaining error curved surfaces $Z=h_{k-1,1}(x, y)$ and $Z=h_{k-1,2}(x, y)$, respectively corresponding to positive and negative values of said errors;

representing said error curved surfaces $z=h_{k-1,1}(x, y)$ and $Z=h_{k-1,2}(x, y)$ by equal difference lines;

creating polyhedrons $Z=i_{k-1,1}(x, y)$ and $Z=i_{k-1,2}(x, y)$ based on said equal difference lines;

computing errors in Z-axis components of the polyhedron $Z=i_{N-2,1}(x, y)$ to an error curved surface $Z=h_{N-2,1}(x, y)$, and errors in z-axis components of the polyhedron $Z=i_{N-2,2}(x, y)$ to the error curved surface $Z=h_{N-2,2}(x, y)$;

obtaining error curved surfaces $z=h_{N-1,1}(x,y)$ and $z=h_{N-1,2}(x,y)$ respectively corresponding to positive and negative values of said errors; and representing said error curved surfaces $Z=h_{N-1,1}(x, y)$ and $Z=h_{N-1,2}(x, y)$ by equal difference lines.

12. The method of claim 11, further comprising the step of:

successively adding error values that are restored based on said equal difference lines to the feature values restored based on said contour lines set to the step (j), where $2 \leq j \leq N$.

* * * * *

UNITED STATES PATENT AND TRADEMARK OFFICE
CERTIFICATE OF CORRECTION

PATENT NO. : 5,694,331

DATED : December 2, 1997

INVENTOR(S) : Yamamoto et al.

Figure 12A:
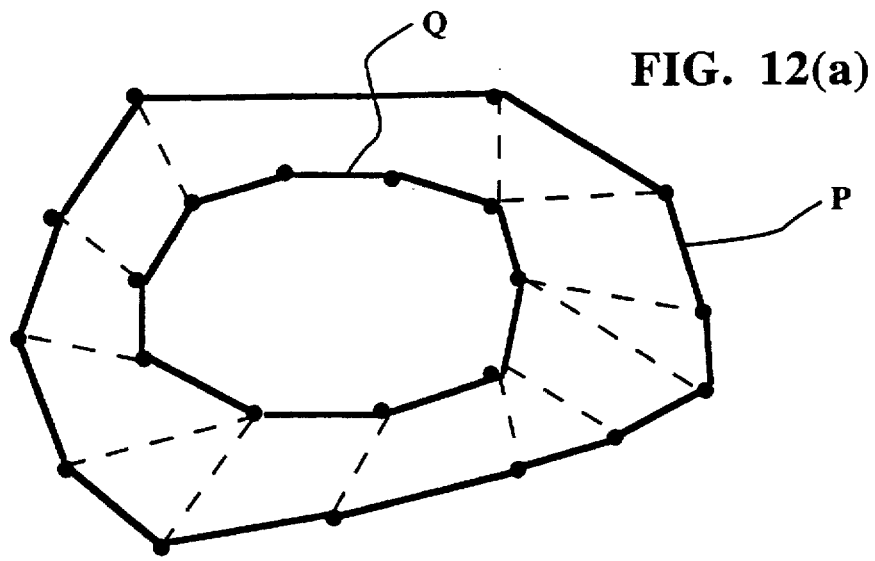
FIG. 12 shows at (a) to (c) an interpolation process in accordance with the invention, in which a polygon made from an isoluminance line is convex and has no bifurcation.
Figure 12B:
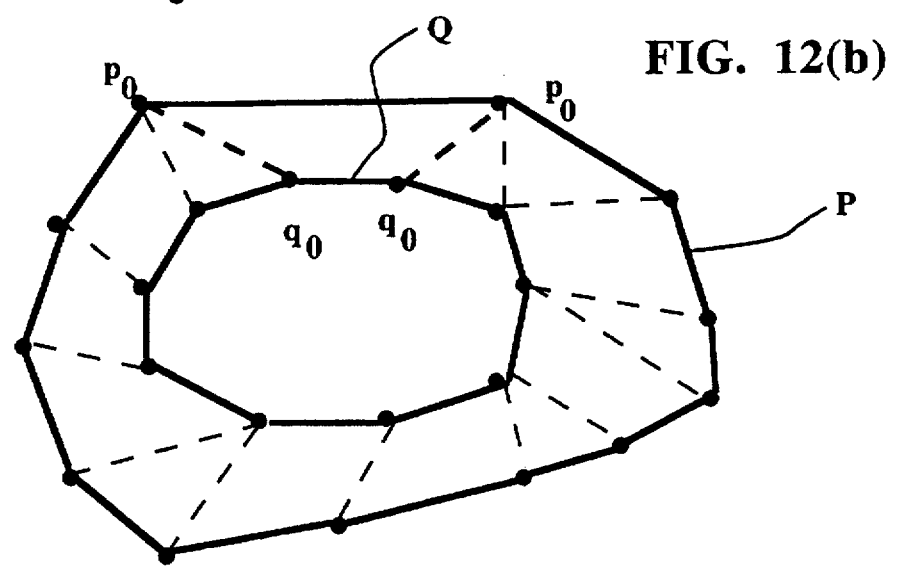
Figure 12C:
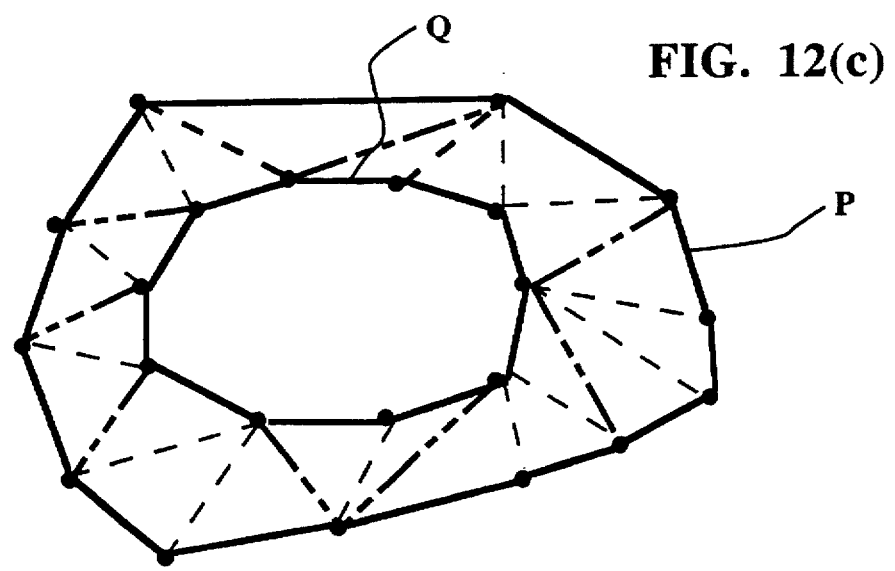
Figure 16A:
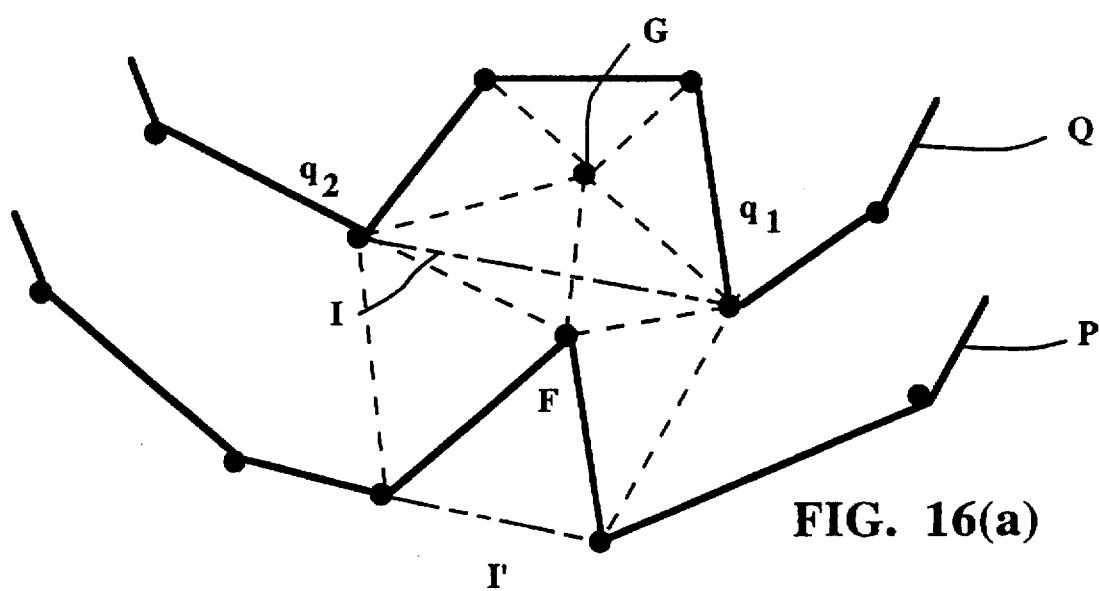
FIG. 16 shows an interpolation process in accordance with the invention, in which both polygons made from the isoluminance lines of the lower level or the higher level are concave.
Figure 16B:
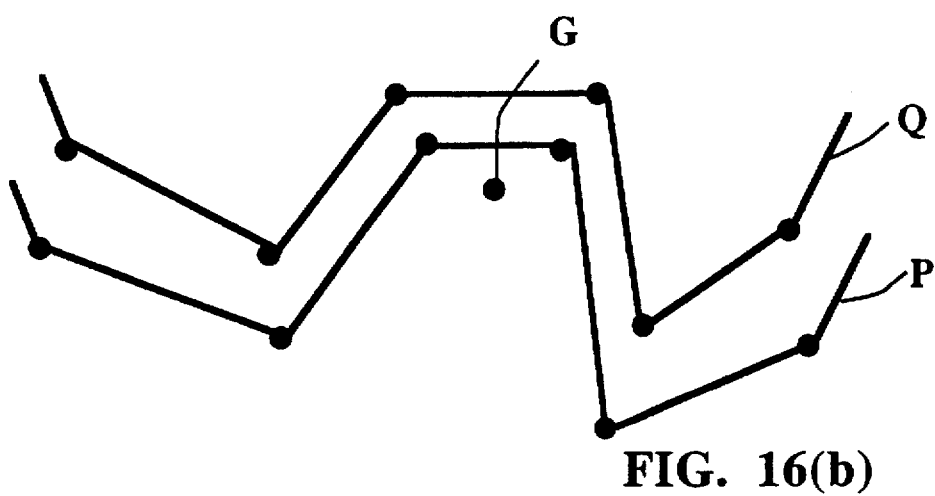

It is certified that error appears in the above-identified patent and that said Letters Patent is hereby corrected as shown below:

Column 5, line 59, "$Z = h_{N-1,2}(x,y)$" should read
-- $Z = h_{N-1,1}(x,y)$ --;

Column 6, line 6, "FIG. 1 shows" should read
-- FIG. 1 and 1A show --;

Column 6, line 35, " FIG. 12 shows" should read
-- FIG. 12(a) - 12(c) show --;

Column 6, line 47, "FIG. 16 shows" should read
-- FIG. 16(a) - 16(b) show --;

Column 7, line 14, "FIG. 29 shows" should read
-- FIG. 29 and 29(a) show --;

Column 7, line 44, "FIG. 1" should read
-- FIG 1(a) --;

Column 10, line 45, "FIG. 12 at (a) to (c)" should read
-- FIG. 12(a) - 12(c) --;

Column 10, line 48, "FIG. 12 at (a)" should read
-- FIG. 12(a) --;

Column 10, line 51, "FIG. 12" should read
-- FIG 12(a) - 12 (c) --;

Column 10, line 52, "FIG. 12" should read
-- FIG 12(b) --;

Column 10, line 53, "FIG. 12 at (b)" should read
-- FIG. 12(b) --;

Column 10, line 56, "FIG. 12 at (b)" should read
-- FIG. 12(b) --;

UNITED STATES PATENT AND TRADEMARK OFFICE
CERTIFICATE OF CORRECTION

PATENT NO. : 5,694,331
DATED : December 2, 1997
INVENTOR(S) : Yamamoto et al.

It is certified that error appears in the above-identified patent and that said Letters Patent is hereby corrected as shown below:

Column 10, line 60, " FIG. 12 at (c)" should read
-- FIG. 12(c) --;

Column 12, line 29, "FIG. 16 at (a) should read
-- FIG. 16(a) --;

Column 12, line 54, "FIG. 16. at (b)" should read
-- FRG. 16(b) --;

Column 17, line 45, "FIG. 29" should read
-- FIG. 29 and 29(a) --;

Column 18, line 2, "$i_{N-2}(x,y)$" should read
-- $i_{N-2,1}(x,y)$ --.

Signed and Sealed this

Fifth Day of January, 1999

Attest:

Attesting Officer

*Acting Commissioner of Patents and Trademarks*